US012567774B2

(12) United States Patent
Williams et al.

(10) Patent No.: US 12,567,774 B2
(45) Date of Patent: Mar. 3, 2026

(54) ELECTRIC MOTOR

(71) Applicant: Electric Torque Machines, Inc.,
Minneapolis, MN (US)

(72) Inventors: Tyler K. Williams, Flagstaff, AZ (US);
Thomas F. Janecek, Flagstaff, AZ (US)

(73) Assignee: Electric Torque Machines, Inc.,
Minneapolis, MN (US)

( * ) Notice: Subject to any disclaimer, the term of this
patent is extended or adjusted under 35
U.S.C. 154(b) by 306 days.

(21) Appl. No.: 18/271,998

(22) PCT Filed: Jan. 27, 2022

(86) PCT No.: PCT/US2022/014069
§ 371 (c)(1),
(2) Date: Jul. 12, 2023

(87) PCT Pub. No.: WO2022/165015
PCT Pub. Date: Aug. 4, 2022

(65) Prior Publication Data
US 2024/0079916 A1     Mar. 7, 2024

Related U.S. Application Data

(60) Provisional application No. 63/210,284, filed on Jun.
14, 2021, provisional application No. 63/163,995,
(Continued)

(51) Int. Cl.
*H02K 1/14*        (2006.01)
*H02K 3/28*        (2006.01)

(52) U.S. Cl.
CPC ............... *H02K 1/148* (2013.01); *H02K 3/28*
(2013.01)

(58) Field of Classification Search
CPC ........ H02K 1/141; H02K 1/145; H02K 1/146;
H02K 1/148; H02K 21/225
(Continued)

(56) References Cited

U.S. PATENT DOCUMENTS 2,243,318  A      5/1941  William
5,306,183  A      4/1994  Holt et al.
(Continued)

FOREIGN PATENT DOCUMENTS

CN       111371206  A      7/2020
DE        29500878  U1    10/1995
(Continued)

OTHER PUBLICATIONS

International Search Report and Written Opinion for PCT Application No. PCT/US2022/014069, Dated May 20, 2022, pp. 15.
(Continued)

*Primary Examiner* — Christopher M Koehler
*Assistant Examiner* — Ahmed F Seck
(74) *Attorney, Agent, or Firm* — Kinney & Lange, P.A.

(57)        ABSTRACT
An electric motor includes a rotor and a stator formed by a plurality of stator phases. The stator phases include coils that extend fully about the motor axis of the motor. The stator phases further includes flux rings disposed on opposite axial sides of the coil and that are joined by axial returns. The stator phases electromagnetically drive rotation of the rotor on the motor axis. Stator segments are formed by one or more stator phases grouped together. Rotor segments are formed by one or more rotor phases grouped together. Motor segments are formed by one or more stator segments and one or more associated rotor segments. Motor segments are stacked along a shaft to form the electric motor.

20 Claims, 12 Drawing Sheets

Related U.S. Application Data filed on Mar. 22, 2021, provisional application No. 63/143,754, filed on Jan. 29, 2021.

(58) Field of Classification Search
USPC .............................................. 310/49.15, 257
See application file for complete search history.

(56) References Cited

U.S. PATENT DOCUMENTS

| | | | |
|---|---|---|---|
| 6,924,579 | B2 | 8/2005 | Calley |
| 7,199,500 | B2 | 4/2007 | Yoshia |
| 7,626,308 | B2 | 12/2009 | Kang et al. |
| 7,876,019 | B2 | 1/2011 | Calley |
| 8,242,658 | B2 | 8/2012 | Calley et al. |
| 8,395,291 | B2 | 3/2013 | Calley et al. |
| 8,405,275 | B2 | 3/2013 | Calley et al. |
| 8,415,848 | B2 | 4/2013 | Calley et al. |
| 8,749,108 | B2 | 6/2014 | Dyer et al. |
| 8,760,023 | B2 | 6/2014 | Calley et al. |
| 8,854,171 | B2 | 10/2014 | Janecek |
| 8,952,590 | B2 | 2/2015 | Calley et al. |
| 8,970,205 | B2 | 3/2015 | Janecek et al. |
| 8,994,243 | B2 | 3/2015 | Calley et al. |
| 9,006,951 | B2 | 4/2015 | Janecek et al. |
| 9,236,773 | B2 | 1/2016 | Janecek et al. |
| 9,360,020 | B2 | 6/2016 | Janecek |
| 9,509,181 | B2 | 11/2016 | Janecek et al. |
| 9,618,003 | B2 | 4/2017 | Janecek et al. |
| 9,749,108 | B2 | 8/2017 | Hoshino et al. |
| 11,646,635 | B2 | 5/2023 | Janecek et al. |
| 2002/0074891 | A1* | 6/2002 | Gieras ................... H02K 21/145 310/254.1 |
| 2004/0046478 | A1 | 3/2004 | Zierer et al. |
| 2005/0012427 | A1 | 1/2005 | Seki et al. |
| 2009/0206696 | A1 | 8/2009 | Calley |
| 2011/0221298 | A1 | 9/2011 | Calley et al. |
| 2012/0119599 | A1 | 5/2012 | Calley et al. |
| 2012/0119609 | A1 | 5/2012 | Janecek |
| 2012/0234108 | A1 | 9/2012 | Janecek et al. |
| 2012/0235519 | A1 | 9/2012 | Dyer et al. |
| 2013/0002068 | A1 | 1/2013 | Miyasaka et al. |
| 2013/0015733 | A1 | 1/2013 | Rasch et al. |
| 2015/0048708 | A1* | 2/2015 | Nord ...................... H02K 1/145 310/156.56 |
| 2015/0048712 | A1 | 2/2015 | Janecek et al. |
| 2015/0147188 | A1 | 5/2015 | Danielsson |
| 2017/0113773 | A1 | 4/2017 | Kaiser et al. |
| 2020/0031445 | A1 | 1/2020 | Wei |
| 2020/0083762 | A1* | 3/2020 | Nitta ........................ H02K 3/04 |
| 2023/0058117 | A1 | 2/2023 | Williams et al. |

FOREIGN PATENT DOCUMENTS

| | | | |
|---|---|---|---|
| DE | 102010018145 | A1 | 10/2011 |
| DE | 102011084296 | A1 | 4/2013 |
| DE | 112014006362 | T5 | 11/2016 |
| EP | 1063754 | A2 | 12/2000 |
| EP | 1587207 | A1 | 10/2005 |
| EP | 2006977 | A2 | 12/2008 |
| EP | 2159903 | A2 | 3/2010 |
| EP | 2594477 | A1 | 5/2013 |
| EP | 2686939 | A2 | 1/2014 |
| EP | 3082231 | A1 | 10/2016 |
| GB | 2491880 | A | 12/2012 |
| JP | 2009005420 | A | 1/2009 |
| WO | 2010064368 | A1 | 6/2010 |
| WO | 2012125790 | A2 | 9/2012 |
| WO | 2015089518 | A1 | 6/2015 |
| WO | 2015163871 | A1 | 10/2015 |
| WO | 2021163156 | A1 | 8/2021 |
| WO | 2022035940 | A1 | 2/2022 |
| WO | 2022066616 | A2 | 3/2022 |
| WO | 2022165015 | A1 | 8/2022 |
| WO | 2023043904 | A1 | 3/2023 |
| WO | 2023055690 | A2 | 4/2023 |
| WO | 2023114290 | A1 | 6/2023 |

OTHER PUBLICATIONS

International Search Report and Written Opinion for PCT Application No. PCT/US2022/014093, Dated Jul. 5, 2022, pp. 22.

Invitation to Pay Additional Fees for PCT Application No. PCT/US2022/014093, Dated May 12, 2022, pp. 14.

International Preliminary Report on Patentability for PCT Applicaiton No. PCT/US2022/014093, Dated Aug. 10, 2023, pp. 15.

International Preliminary Report on Patentability of PCT Application No. PCT/US2022/04069, Dated Aug. 10, 2023, pp. 11.

\* cited by examiner

ELECTRIC MOTOR

CROSS-REFERENCE TO RELATED APPLICATION(S)

This application claims the benefit of U.S. Provisional Application No. 63/143,754 filed Jan. 29, 2021 and entitled "ELECTRIC MOTOR HAVING LAMINAS-FORMED TEETH," and claims the benefit of U.S. Provisional Application No. 63/163,995 filed Mar. 22, 2021 and entitled "ELECTRIC MOTOR," and claims the benefit of U.S. Provisional Application No. 63/210,284 filed Jun. 14, 2021 and entitled "ELECTRIC MOTOR HAVING LAMINAS-FORMED TEETH," the disclosures of which are hereby incorporated by reference in their entireties.

BACKGROUND

The present disclosure relates generally to electric machines. More specifically, the present disclosure relates to transverse flux electric machines.

Electric motors utilize electricity to generate a mechanical output. Some electric motors generate rotational outputs. In alternating current (AC) induction motors, a stator is electrically energized to electromagnetically drive rotation of a rotor about a motor axis. The stator includes laminates and windings. The rotor includes permanent magnets that are acted on by the electromagnetic field induced by current through the stator to cause rotation of the rotor. Such electric motors include coils that extend axially relative to the rotational axis and that extend axially beyond the ends of the rotor to wrap around and form the ends of the coil windings.

SUMMARY

According to an aspect of the disclosure, an electric motor includes a rotor configured to rotate on an axis; and a stator configured to electromagnetically drive the rotor to rotate the rotor on the axis, wherein the stator includes a plurality of stator phases. Each stator phase of the plurality of stator phases includes a first flux ring disposed about the axis and opposing a second flux ring disposed about the axis; a coil disposed axially between the first flux ring and the second flux ring; and a plurality of axial returns extending between the first flux ring and the second flux ring, the plurality of axial returns disposed on an opposite radial side of the coil from the rotor. A first stator phase of the plurality of stator phases is disposed within a first housing to form a first phase assembly and a second stator phase of the plurality of stator phases is disposed within a second housing to form a second phase assembly. The first phase assembly mates with the second phase assembly at a keyed interface.

According to an additional or alternative aspect of the disclosure, a phase assembly for an electric motor includes a stator phase and a phase housing. The stator phase includes a first flux ring disposed about an axis and opposing a second flux ring disposed about the axis; a coil disposed axially between the first flux ring and the second flux ring; and a plurality of axial returns extending between the first flux ring and the second flux ring. The phase housing has a first axial side, a second axial side, an outer radial side extending between the first axial side and the second axial side, and an inner radial side extending between the first axial side and the second axial side. The stator phase is disposed within the phase housing.

According to another additional or alternative aspect of the disclosure, a motor segment for an electric motor includes a stator segment having at least one stator phase extending about an axis, a rotor segment having at least one rotor phase, the at least one rotor phase including a rotor hub and a permanent magnet array supported by the rotor hub; and a segment housing containing both the stator segment and the rotor segment. The at least one stator phase includes a first flux ring disposed about the axis and opposing a second flux ring disposed about the axis; a coil disposed axially between the first flux ring and the second flux ring; and a plurality of axial returns extending between the first flux ring and the second flux ring.

According to another additional or alternative aspect of the disclosure, an electric motor includes a rotor configured to rotate relative to the stator on an axis and a plurality of housings stacked together to form one of the rotor and the stator. Each housing of the plurality of housings contains at least one of a rotor phase and a stator phase. The stator is formed by a plurality of stator phases, each stator phase of the plurality of stator phases including a plurality of teeth that extend circumferentially about the axis and that are simultaneously polarized by a coil of the each stator phase.

According to another additional or alternative aspect of the disclosure, the stator is formed by a plurality of stator phases, and wherein each stator phase of the plurality of stator phases includes a coil extending around the axis and a plurality of teeth arrayed around the axis and configured to be polarized simultaneously by the coil.

DETAILED DESCRIPTION

Figure 1:
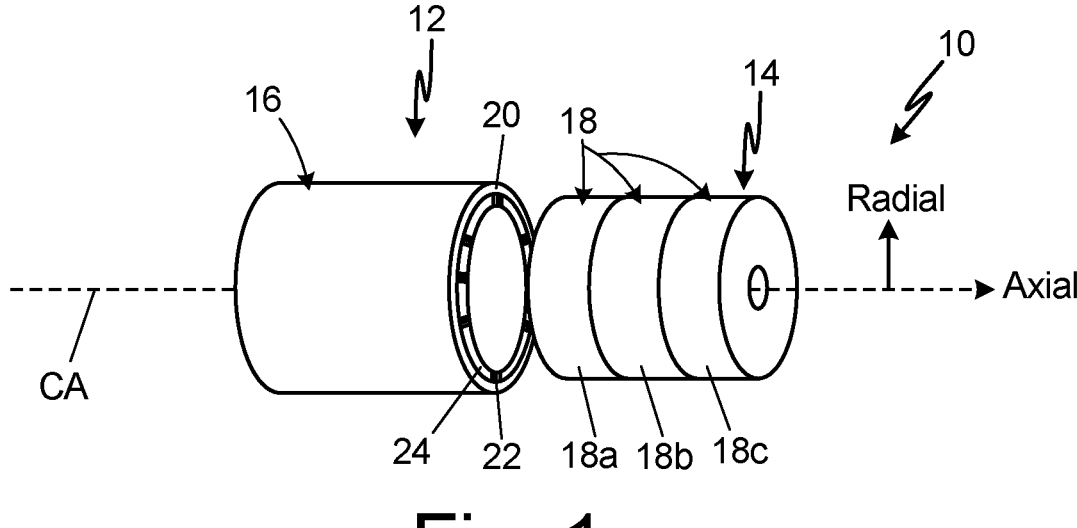
FIG. 1 is an isometric exploded view of an electric motor having an outer rotator.

The present disclosure concerns electric machines, such as electric motors and electric generators. It is understood that, while the electric machine is generally discussed as being an electric motor, the principles discussed herein are applicable to other electric machines, such as generators. The main type of motor presented herein is a transverse flux motor, which is distinguished from axial or radial flux type electric motors.

The electric machines of this disclosure include a rotor rotatable about a motor axis and a stator configured to drive rotation of the rotor. According to aspects of the disclosure, the stator of the transverse flux electric machine includes stator phases, such as one, two, three, or more, formed from flux rings and a coil disposed axially between the opposing flux rings. Multiple of the stator phases can be stacked together along a common axis to form a stator segment of an electric machine. The stator phases and/or stator segments can be assembled together to form the stator of the motor. The rotor of the electric machine can include one or more rotor phases, such as one, two, three, or more, formed from a supporting rotor body and a permanent magnet array. Multiple rotor phases can be stacked together along the common axis to form a rotor segment of the electric machine. The rotor phases and/or rotor segments can be assembled together along the axis to form the rotor of the motor. Stator phases and/or segments can be associated with rotor phases and/or segments to form motor segments. For example, a motor segment can be formed by a rotor segment and associated stator segment disposed together in a common housing. Multiple motor segments can be stacked together to form a motor having increased torque and power relative to a motor having fewer phases and segments.

Several of the figures of the disclosure show a common axis, which is sometimes referred to as a motor axis. An axis of rotation of the rotor is disposed coaxially with the common axis. The term annular is used herein, which can refer to a ring shape (continuous or broken) about the common axis, which can be coaxial with the common axis. The term radial is used herein which when referring to a direction is any direction orthogonal to the common axis, unless otherwise noted. The term axial is used herein which when referring to a direction is any direction parallel with the common axis, unless otherwise noted. The terms circumferential or circumferentially as used herein means around the common axis, unless otherwise noted.

Components can be considered to radially overlap when those components are disposed at common axial locations along common axis CA. A radial line extending from common axis CA will extend through radially overlapping components. Components can be considered to axially overlap when those components are disposed at common radial and circumferential locations such that an axial line parallel to common axis CA extends through the axially overlapping components. Components can be considered to circumferentially overlap when aligned about common axis CA, such that a circle centered on common axis CA passes through each of the circumferentially overlapping components.

FIG. 1 is an isometric exploded block diagram of electric motor 10. Electric motor 10 includes rotor 12 and stator 14. Rotor 12 includes permanent magnet array 16. Stator 14 includes stator phases 18a-18c (collectively herein "stator phase 18" or "stator phases 18"). In the example shown, permanent magnet array 16 includes permanent magnets 22 and concentrators 24.

In the example shown, rotor 12 is disposed radially outside of and about stator 14. In the example shown in FIG. 1, the rotor 12 and the stator 14 are separated, but it is understood that in operation the stator 14 is located radially inside of the rotor 12. Such a relationship is referred to as an outer rotor, being that the outer part of the electric motor 10 (the rotor 12) rotates relative to the inner part of the electric motor 10 (the stator 14). Both the rotor 12 the stator 14 are cylindrical and are orientated coaxial with each other along the common axis CA.

In the example shown, the stator 14 includes multiple stator phases 18. In particular, three stator phases 18a, 18b, 18c are shown. It is understood that a stator phase 18 can alternatively be referred to as a phase assembly. In coordination, but at different peak times, the stator phases 18 generate magnetic flux across an air gap disposed radially between the rotor 12 and the stator 14, which interacts with the permanent magnet array 16 of the rotor 12. Specifically, the flux interacts with the magnets 22 and concentrators 24 of the rotor 12 to push and pull the rotor 12 to drive rotation of the rotor 12. The magnets 22 and concentrators 24 are orientated in the axial direction. For example, a magnet 22 can extend the entire axial length of the rotor 12. The magnets 22 and concentrators 24 are interleaved to form the permanent magnet array 16 around the rotor 12. While rotor 12 is shown as formed by a single rotor phase 20, it is understood that the rotor 12 can include multiple rotor phases 20 in other examples, as discussed in more detail below.

The stator phases 18 are electromagnetically polarized by the coils of each stator phase 18 out-of-phase with respect to each other, such as 120-degrees electrically out-of-phase, to electromagnetically interact with the permanent magnet array 16 of rotor 12 to drive rotation of the rotor 12. While three stator phases 18 are shown herein, other embodiments may include a single stator phase 18, only two stator phases 18, or more than three stator phases 18. In some examples, the stator phases 18 are axially aligned. In other examples, the stator phases 18 are circumferentially offset about the axis CA such that each stator phase 18 is rotated about the axis CA relative to the other stator phases 18. The stator phases 18 are respectively activated axially, rather than radially. For example, stator phase 18a is in a first phase state, while stator phase 18b is in a second phase state, and stator phase 18c is in a third phase state, the three phase states 120-degrees electrically out-of-phase with respect to each other. The stator phases 18 are activated such that the phase states shift axially along the common axis CA rather than circumferentially about the axis, as each phase 18 is in the same phase state fully around the axis CA.

The embodiment of the motor 10 shown includes three phases corresponding to the three stator phases 18 and the coils therein in which three AC signals (sinusoidal, trapezoidal, etc.) are delivered through the coils 120-degrees electrically offset. If there were two stator phases 18 and two coils, then the two sinusoidal AC signals would be 180-degrees apart, or 90-degrees apart for sets of four stator phases 18, etc.

In some examples, the rotor 12 is formed from multiple rotor phases 20. The rotor phases 20 can be configured such that the permanent magnets 22 and concentrators 24 of each rotor phase 20 are axially aligned, similar to the elongate magnets shown across the full length of the rotor 12. In such an example, the permanent magnet array 16 can be formed by multiple magnet phases each associated with a rotor phase 20. The magnet phases can be configured such that the permanent magnets 22 of the magnet phases are axially aligned. Such a configuration can correspond to stator phases 18 that are rotationally offset about the common axis CA.

In other examples, the magnets 22 of each rotor phase 20 are circumferentially offset about the axis CA such that each rotor phase 20 is rotated about the axis CA relative to an adjacent rotor phase 20. In such an example, the stator phases 18 can be axially aligned.

In a first example, the stator phases 18 are axially aligned and the rotor phases 20 are offset and rotated about the axis CA relative to each other. In a second example, the stator phases 18 are offset and rotated about the axis CA and the rotor phases 20 are axially aligned.

During operation, power is provided to the coils of the stator phases 18. Stator phases 18 generate electromagnetic fields that interact with the permanent magnet array 16 across an air gap formed annularly about the stator 14 and disposed radially between the stator 14 and the rotor 12 to drive rotation of rotor 12. The embodiment of the motor 10 shown includes three phases corresponding to the three stator phases 18 and thus includes three coils therein in which three AC signals (sinusoidal, trapezoidal, etc.) are delivered through the coils 120-degrees electrically offset. If there were two stator phases 18 and two coils, then the two sinusoidal AC signals would be 180-degrees apart, or 90-degrees apart for sets of four stator phases 18, etc.

Figure 2:
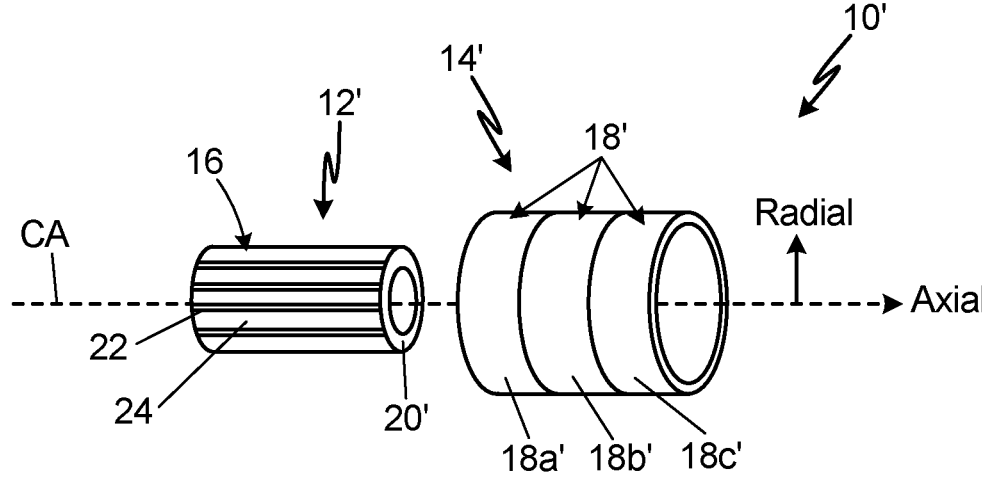
FIG. 2 is an isometric exploded view of an electric motor having an inner rotator.

FIG. 2 is an isometric exploded view of electric motor 10'. Electric motor 10' includes rotor 12' and stator 14'. Motor 10' is substantially similar to motor 10 in structure and operation except that rotor 12' is disposed radially within stator 14' such that motor 10' is an inner rotor while motor 10 is an outer rotor. Rotor 12' includes permanent magnet array 16. Stator 14' includes stator phases 18a'-18c' (collectively herein "stator phase 18'" or "stator phases 18'"). In the example shown, permanent magnet array 16 includes permanent magnets 22 and concentrators 24. In the example shown in FIG. 2, the rotor 12' is configured to be located radially inside of the stator 14'. Such a relationship is referred to as an inner rotor, being that the inner part of the electric motor 10' (the rotor 12') rotates relative to the outer part of the electric motor 10' (the stator 14').

Figure 3:
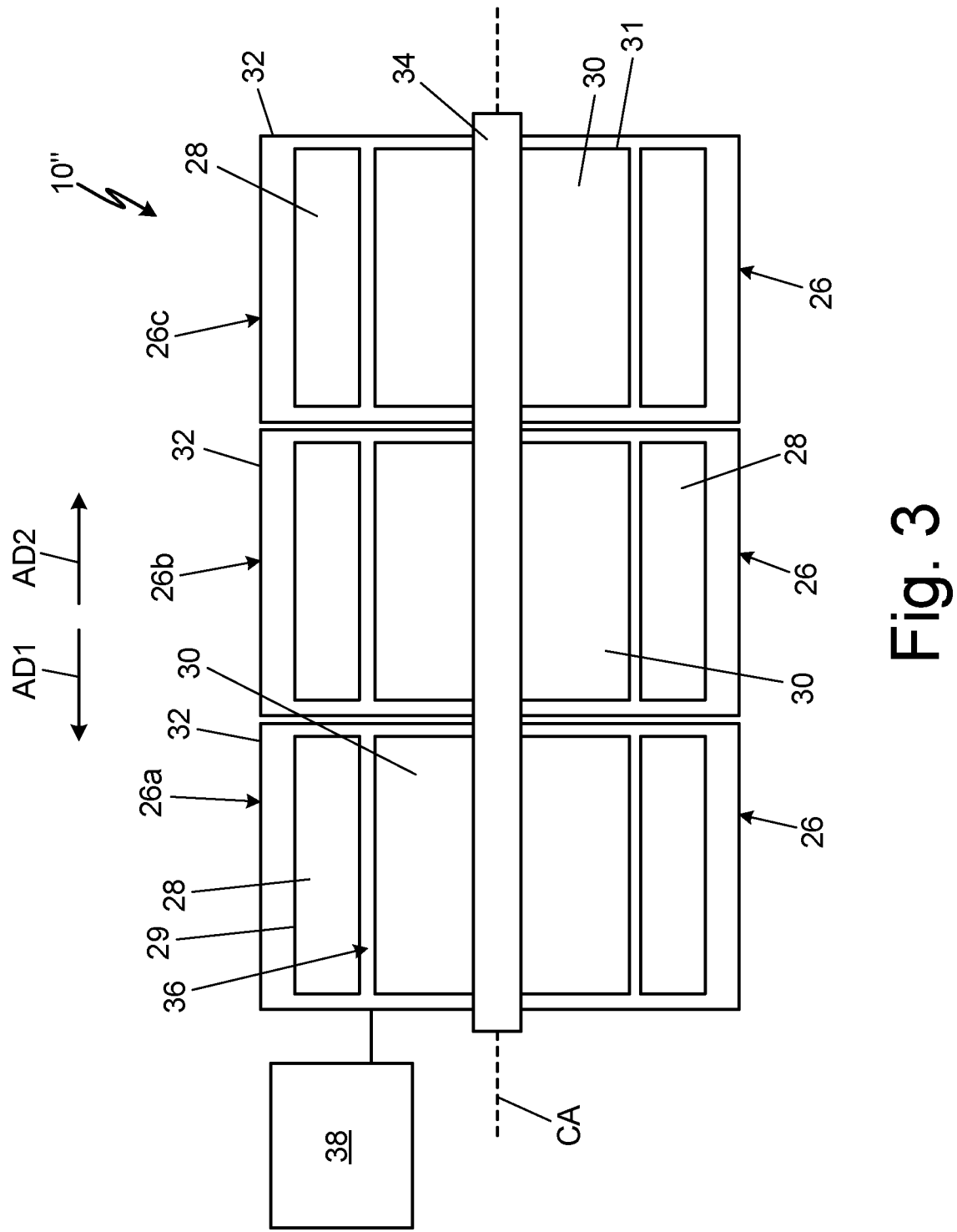
FIG. 3 is a schematic block diagram illustrating an electric motor.

FIG. 3 is a schematic block diagram illustrating an electric motor 10". Electric motor 10" is substantially similar to electric motor 10 (FIG. 1) and electric motor 10' (FIG. 2) and is configured similarly and with similar operating principles. Electric motor 10" includes motor segments 26a-26c (collectively herein "motor segment 26" or "motor segments 26") that are stacked together to form the electric motor 10". Electric motor 10" includes first components 28 and second components 30. First components 28 and second components 30 form the electromagnetically interacting components of electric motor 10". One of first components 28 and second components 30 form stator segments of the electric motor 10" and the other of first components 28 and second components 30 form rotor segments of the electric motor 10".

Motor 10" is an outer rotor in examples in which the first components 28 form the rotor and the second components 30 form the stator. The motor 10" is an inner rotor in examples in which the first components 28 form the stator and the second components 30 form the rotor. For each motor segment 26, the first component 28 and second component 30 are disposed within a motor segment housing 32. Air gap 36 is disposed radially between first components 28 and second components 30. Air gap 36 is disposed annularly about the second components 30. Magnetic flux transfers across the air gap 36 between the first components 28 and second components 30 to drive rotation of the one of first components 28 and second components 30 forming the rotor of the motor 10".

In the example shown, each first component 28 is associated with a second component 30 to form a motor segment 26. It is understood that whichever of the first components 28 and second components 30 form the rotor phases and/or rotor segments can be formed as a unitary component. In the outer rotor examples, for example, the first component 28 within a motor segment 26 can be integrated together or integrally formed to form a single rotor phase associated with each of the stator phases formed by the second component 30 of that motor segment 26.

Each motor segment 26 can be a self-contained within the motor segment housing 32. For example, the motor segment housing 32 can enclose the first components 28 and second components 30 on both axial sides of the motor segment 26 and circumferentially about the motor segment 26. It is understood that each motor segment 26 can include multiple stator phases and, in some examples, multiple rotor phases. In inner rotor examples, each first component 28 can include one or multiple stator phases and each second component 30 can include one or multiple rotor phases. In outer rotor examples, each second component 30 can include one or multiple stator phases and each first component 28 can include one or multiple rotor phases.

In some examples, each of first components 28 and second components 30 can be self-contained within a component housing. For example, each first component 28 can be disposed with in a first component housing 29 and each second component 30 can be disposed in a second component housing 31. It is understood that in such examples the first components 28 and second components 30 may not be contained within a common segment housing 32 but instead contained within their own respective housings. The first components 28 and second components 30 can be axially stacked to form the stator and/or rotor of the motor 10". Each first component housing 29 can contain one or more rotor phases or stator phases, such as one, two, three or more. Each second component housing 31 can contain on or more rotor phases or stator phases, such as one, two, three or more.

In inner rotor examples, the rotor of motor 10" can be formed by stacking a plurality of second housings 31 together. The stator of motor 10" can be formed by stacking a plurality of first housings 29 together. In outer rotor examples, the stator of motor 10" can be formed by stacking a plurality of second housings 31 together. The rotor of motor 10" can be formed by stacking a plurality of first housings 29 together. In either the inner or outer rotor example, additional ones of first housings 29 and/or second housings 31 can be stacked to axially elongate the rotor or stator.

The motor segments 26 can be stacked axially along the common axis CA to form the electric motor 10". Motor segments 26 are stacked coaxially such that each of the motor segment 26 generates the rotational output from motor 10". Second components 30 can be fixed with respect to shaft 34, such as directly to shaft 34. In inner rotor examples, shaft 34 can be a drive shaft configured to be rotatably driven by motor 10". In the inner rotor examples, the second components 30 (forming the rotor) can be individually fixed to shaft 34 to drive rotation of shaft 34. In such an inner rotor example, bearings can be disposed between the first components 28 and the shaft 34 to allow for rotation of the shaft 34 relative to the stator formed by the first components 28. The first components 28 can be fixed directly to the segment housing 32, such as by potting compound among other options.

In outer rotor examples, shaft 34 can be an axle that does not rotate on the common axis CA but that supports the motor segments 26. In the outer rotor examples, the second components 30 (forming the stator) can be mounted to the shaft 34 to remain stationary during operation, and the first components 28 (forming the rotor 12) can be mounted to the shaft 34 to rotate relative to the shaft 34 on the axis CA. In such outer rotor examples, the rotor phases can be fixed to each other to rotate together and the rotor phases at the axial ends of each motor segment 26 can be rotatably mounted on shaft 34, such as by bearings. In the outer rotator examples, an output component, such as a drive shaft, can be connected to one of the exposed axial ends of the motor 10″ to provide the rotational output from the motor 10″.

Motor segments 26 can be stacked in any desired manner along the shaft 34. In some examples, the segment housings 30 can be connected to one another, such as at the axial faces of the segment housings 30. In some examples, the segment housings 30 can be open at the axial ends to facilitate mating between first components 28 of adjacent motor segments 26 and/or mating between second components 30 of adjacent motor segments 26. In some examples, each of the motor segments 26 can be identical to each other to facilitate axial stacking. In some examples, the segment housings 30 can include keying features on the axial ends that interface to fix the motor segments 26 together. For example, a first axial face of each segment housing 32, oriented in first axial direction AD1, can include one of projections and recesses and the second axial face of each segment housing 32, oriented in second axial direction AD2, can include the other one of projections and recesses. The projections can extend into the recesses with the motor segments 26 mounted together to fix the motor segments 26 together and prevent relative rotation therebetween. In some examples, the multiple motor segments 26 can be disposed in a single housing.

Controller 38 can be operably connected to motor 10″, electrically and/or communicatively, to control operation of motor 10″. The controller 38 can be of any desired configuration for controlling operation of motor 10″ and the rotational output of motor 10″ (e.g., speed, torque, etc.) and can include control circuitry and memory. The controller 38 is configured to store executable code, implement functionality, and/or process instructions. The controller 38 is configured to perform any of the functions discussed herein, including receiving an output from any sensor referenced herein, detecting any condition or event referenced herein, and controlling operation of any components referenced herein. The controller 38 can be of any suitable configuration for controlling operation, gathering data, processing data, etc. The controller 38 can include hardware, firmware, and/or stored software. The controller 38 can be of any type suitable for operating in accordance with the techniques described herein. It is understood that the controller 38 can be entirely or partially disposed across one or more circuit boards. In some examples, the controller 38 can be implemented as a plurality of discrete circuitry subassemblies. The controller 38 can be connected to the coils of each stator phase of the motor 10″ to control the AC signals provided to the coils that drive operation of motor 10″.

An electric driving signal is provided to the stator of motor 10″ to drive rotation of the rotor of motor 10″. The electric driving signals are provided to each stator phase simultaneously, but electrically out-of-phase to drive rotation of rotor. The various stator phases are respectively activated axially, such that each stator phase is in the same activation state fully around the axis while different stator phases can be in different activation states at different locations along the axis.

Motor 10″ formed from motor segments 26 provides significant advantages. The motor 10″ can be configured modularly such that additional motor segments 26 can be added, to increase torque output, or removed, to decrease torque output. Motor segments 26 can be configured identically such that only a single configuration of motor segment 26 needs to be manufactured and multiple motor segments 26 can be assembled together to form a motor 10″. Motors having relatively higher power output can be formed by a greater number of motor segments 26 and motors having relatively lower power output can be formed by a lesser number of motor segments 26. Having the single configuration of motor segment 26 reduces part count and costs associated with maintaining inventory and with manufacturing. Multiple different configurations of motors can be formed from the commonly configured motor segments 26.

Figure 4:
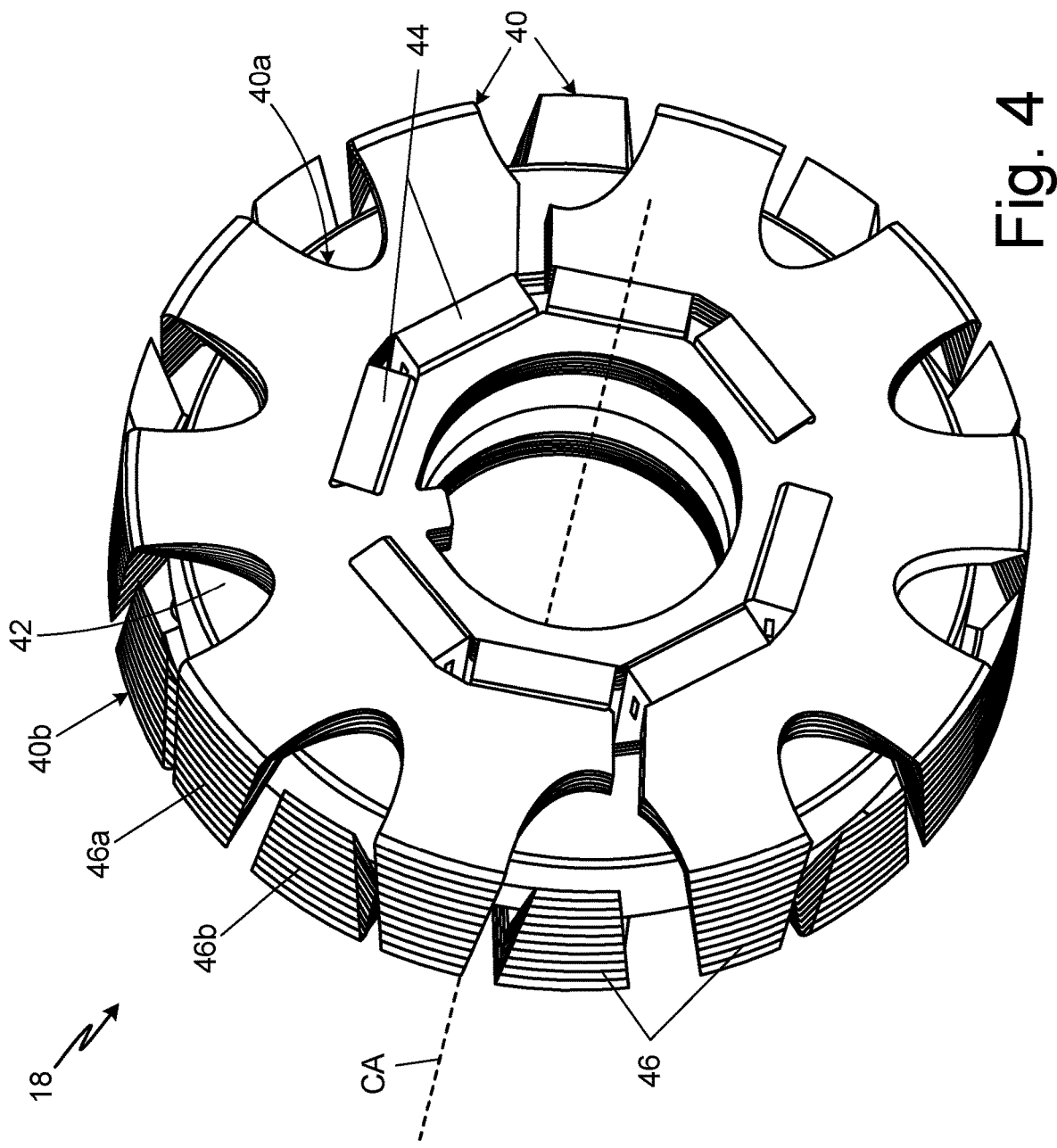
FIG. 4 is an isometric view of a stator phase.

FIG. 4 is an isometric view of a stator phase 18. Stator phase 18 includes flux rings 40*a*, 40*b* (collectively herein "flux ring 40" or "flux rings 40"), coil 42, and axial returns 44. Flux ring 40*a* includes teeth 46*a* and flux ring 40*b* includes teeth 46*b*. Teeth 46*a*, 46*b* are referred to collectively herein as "tooth 46" or "teeth 46". Stator phase 18 is configured for use in an outer rotator motor, such as motor 10 (FIG. 1), but it is understood that the discussion of stator phase 18 applies equally to an inner rotator example, except in a stator phase configured for an inner rotator example the teeth 46 are disposed on an inner radial side of the flux rings 40*a*, 40*b* and the axial returns 44 are disposed on an outer radial side of the coil 42.

Stator phase 18 is configured to be disposed coaxially with a rotor, such as rotor 12 (FIG. 1), on the axis of rotation of the rotor, which is coaxial with the common axis CA. Stator phase 18 is disposed around the axis of rotation. Coil 42 extends circumferentially about the common axis CA. Stator phase 18 includes metallic components formed on each axial side of the coil 42 of that stator phase 18. The stator phase 18 includes metallic components formed on at least one radial side of the coil 42 of that stator phase 18. In some examples, the metallic components can be formed on both radial sides of the coil 42 of stator phase 18. In the example shown, flux rings 40 are formed such that teeth 46 extend over the coil 42 such that teeth 46 are disposed on one radial side of the coil 42 and the axial returns 44 are disposed on a second, opposite radial side of the coil 42. It is understood, however, that in some examples the teeth 46 are formed such that teeth 46 do not project over coil 42. In such an example, metallic components of the stator phase 18 are disposed on a single radial side of the coil 42, with those metallic components formed by the axial returns 44.

The metallic components of stator phase 18 can be formed wholly or partially from stacks of laminations, which stacked laminate sheets can be referred to as a laminate stack. Laminations can be formed from material which is readily susceptible to polarization from the fields generated by coils 42. Such material is typically ferromagnetic. The ferromagnetic materials can be metal such as iron or an alloy of iron, such as steel. More specifically, laminations can be formed from silicon steel, among other options. Ferromagnetic material can be ceramic doped or otherwise embedded with ferromagnetic elements.

Axial returns 44 extend between and electromagnetically connect the opposing flux rings 40*a*, 40*b* of the stator phase 18. Axial returns 44 are disposed on an opposite radial side of coil 42 from the permanent magnet array of the rotor. Axial returns 44 can be formed from laminate sheets stacked circumferentially and oriented axially. The axial returns 44 can have an axially oriented laminate grain. A tangent line to a circle centered on common axis CA and passing through a portion of an axial return 44 can extend through each sheet of the laminate stack of that axial return 44. In some examples, an arc extending circumferentially about common axis CA can pass through each sheet of the laminate stack of an axial return 44.

Coil 42 is formed as hoops of electrically conductive metal, such as copper among other options, that extend circumferentially about the common axis CA. Coil 42 is thus coaxial with the common axis CA. Coil 42 is a winding of wire (e.g., round or ribbon strand), typically copper, around the common axis CA. Thus, coil 42 could be a continuous winding of 20, 30, 40, 50, 100, or less or more loops around the common axis CA. Coil 42 has two termination wires, representing the ends of the circuit of each coil 42 for running an AC signal through the coil 42, which can electrically connect with a controller, such as controller 38 (FIG. 3), to control the AC signal through the coil 42. In the examples shown, each of the coils 42 of a motor (inner rotor or outer rotor) is discrete with respect to the other ones of the coils 42.

The coils 42 of the multiple stator phases 18 of a motor do not radially overlap or cross over each other. No part of any one of the multiple coils 42 is disposed at the same axial location along the common axis CA as any other one of the coils 42. There is an axial gap between each of the coils 42 of the motor. The coils 42 are thus located at separate and distinct axial positions along the common axis CA. Each coil 42 is made as a circular loop with the common axis CA extending through each loop of each coil 42. The coils 42 do not include loops wherein the common axis CA does not extend through such loop. The material of the loops formed by coils 42 is not axially elongate but instead extends circumferentially about the common axis CA. During operation, power, such as electric current, is provided to coil 42. Stator phase 18 generates magnetic fields that interact with the permanent magnet array to drive rotation of rotor.

Adjacent teeth 46a, 46b from the first plurality of teeth 46a and the second plurality of teeth 46b form flux pairs to generate a transverse orientated flux field which interacts with the permanent magnet array 16 of the rotor 12 across a stator-rotor air gap 36 to drive rotation of the rotor 12 with respect to the stator 14. The first plurality of teeth 46a form a first annular array of teeth 46 coaxial with the axis of rotation. The second plurality of teeth 46b form a second annular array of teeth 46 coaxial with the axis of rotation. The flux field is generated by running current through the coil 42. For example, a sinusoidal signal can be run through the coil 42. The reversing nature of the signal through the windings of the coil 42 builds and reverses the polarity between the adjacent pairs from the first plurality of teeth 46a and the second plurality of teeth 46b. The flux pairing of the circumferentially adjacent teeth 46a, 46b is facilitated by the axial returns 44 which form electromagnetic loops between the adjacent teeth 46a, 46b of the pair of flux rings 40a, 40b. Generally, flux flows with the grain of the laminas, along the direction of the laminate grain, as flux will generally follow the path of highest permeability and there is significant resistance to flux jumping from one layer of lamination to another layer of lamination. The flux flow travels along the radially oriented laminas of the flux rings 40 to the axial returns 44. The axial returns 44 have axially oriented laminate grain such that the flux travels axially through the axial returns 44. In the example shown, the teeth 46 are formed by the laminas of the flux rings 40 and the laminas forming the teeth 46 are pitched to have a laminate grain that is neither axial nor radial and is instead transverse, and non-orthogonal, to both the axial and radial directions. It is understood, however, that not all examples are so limited.

Each set of flux paired teeth 46a, 46b can form a pole, with multiple such pairs forming an array of poles circumferentially around the stator phase 18. The poles interact with the permanent magnet array of the rotor to attract and/or repel the rotor and thus drive rotation of the rotor. The first plurality of teeth 46a are interleaved with the second plurality of teeth 46b, in which adjacent teeth 46a, 46b of the first and second pluralities form flux pairs, to form an annular array of poles between adjacent teeth 46a, 46b that is coaxial with the axis of rotation of the rotor 12. Each pole formed by flux paired teeth 46 magnetically pushes and/or pulls the permanent magnets of the rotor as they pass the paired teeth 46 during rotation, such that that annular array of poles are formed simultaneously, and which are all poled in the same orientation about the axis. Being that all the poles of any particular stator phase 18 are activated by the single coil 42 of the stator phase 18, the poles become polarized, and reverse their polarity, simultaneously. Such an arrangement and manner of operation results in a high pole count relative to radial or axial flux motors. Such high pole count is generated with less coils, a single coil 42 in the example shown, than radial or axial flux motors, simplifying operation and providing a smooth torque output from the electric motor of stator phase 18. The high pole count relative to the number of coils simplifies control requiring fewer signals from the controller to generate the high pole count, providing easier control and smoother operation of the motor.

Figure 5A:
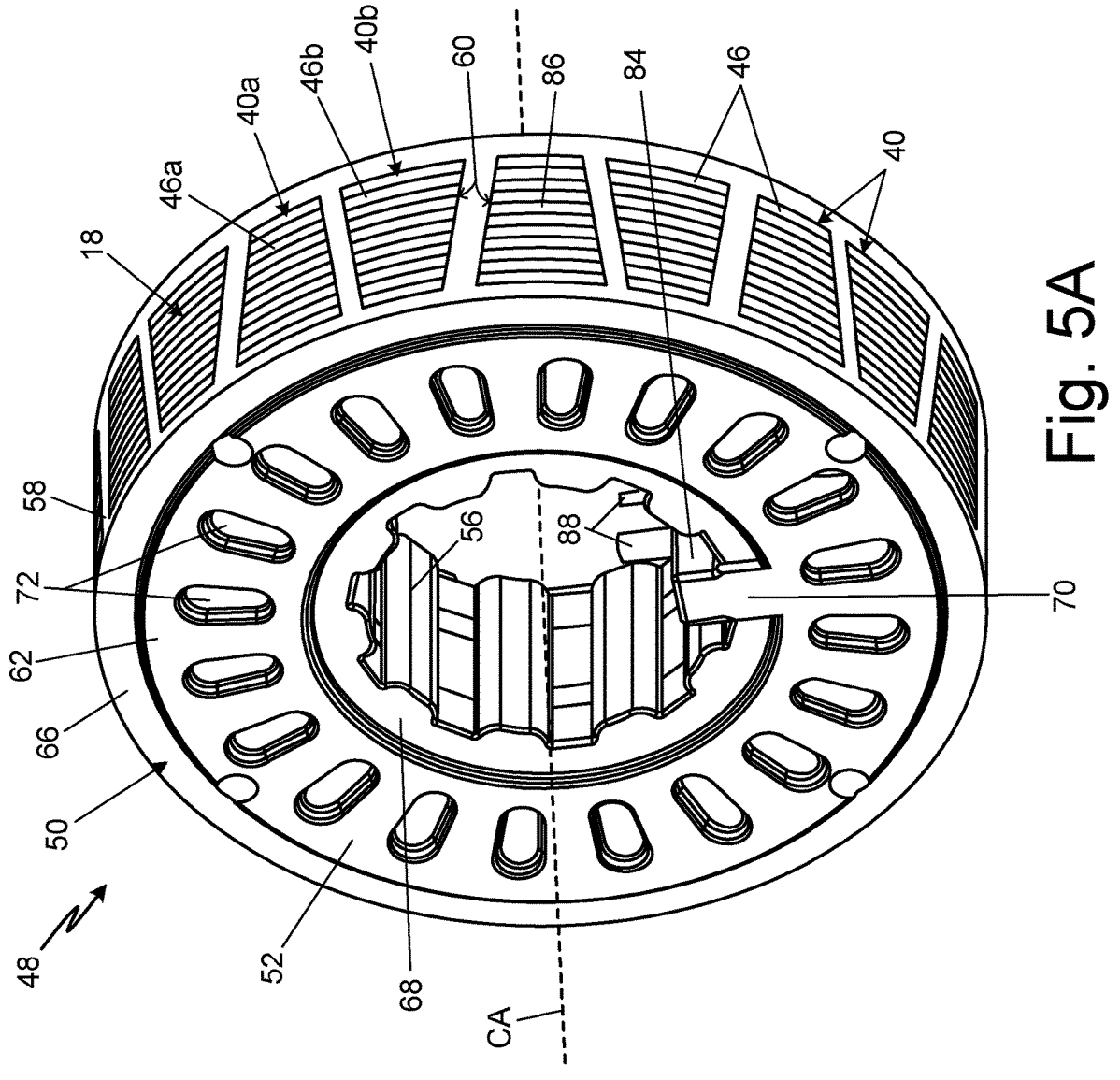
FIG. 5A is a first isometric view of a phase assembly.
Figure 5B:
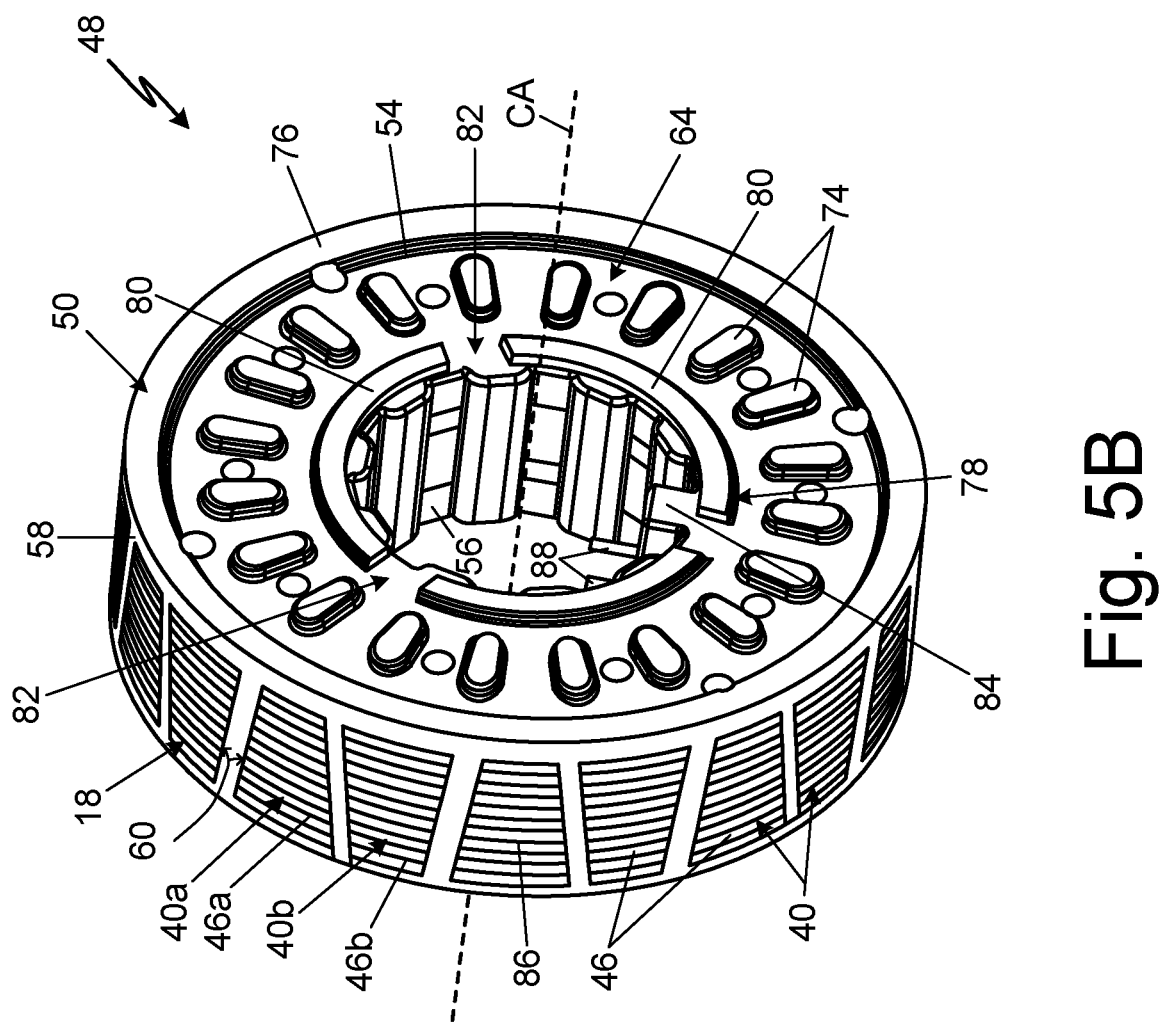
FIG. 5B is a second isometric view of the phase assembly of FIG. 5A.

FIG. 5A is a first isometric view of phase assembly 48. FIG. 5B is a second isometric view of phase assembly 48. FIGS. 5A and 5B will be discussed together. Phase assembly 48 includes a stator phase 18, phase housing 50, first axial side 52, second axial side 54, inner radial side 56, outer radial side 58, tooth slots 60, boss 62, pocket 64, first outer ring 66, first inner ring 68, locator 70, recesses 72, first projections 74, second outer ring 76, second inner ring 78, second projections 80, gaps 82, and power block 84. Flux rings 40a, 40b of stator phase 18 are shown. Teeth 46 of flux rings 40 are shown. Tooth faces 86 of teeth 46 are shown. Wire ends 88 of the coil of stator phase 18 are shown.

Phase assembly 48 is configured to form one stator phase of a stator, such as stator 14 (FIG. 1), of an electric motor, such as electric motor 10 (FIG. 1). Phase assembly 48 is configured such that multiple of phase assemblies 48 can be assembled together to form the stator of the electric motor. Any desired number of the phase assemblies 48 can be assembled together to form the stator.

Stator phase 18 includes flux rings 40a, 40b with a coil 42 (FIG. 4) disposed between the opposing flux rings 40a, 40b. Axial returns 44 (FIG. 4) extend between and connect the flux rings 40a, 40b. The metallic components of stator phase 18 are at least partially disposed within phase housing 50. In the example shown, the coil 42 and axial returns 44 are fully disposed within the phase housing 50. Portions of flux rings 40a, 40b are exposed through phase housing 50 to facilitate flux transfer across the air gap 82 between the rotor and stator of the electric motor containing phase assembly 48. In the example shown, teeth 46 are exposed through tooth slots 60 formed in the flux ring 40. More specifically, the tooth face 86 of each tooth 46 is exposed through the tooth slots 60 to facilitate the flux transfer. Tooth faces 86 are oriented towards the opposed rotor. Generally, it is from the tooth face 86 that each tooth 46 magnetically interacts with the rotor across the air gap between the rotor and the stator phase 18. Teeth 46 are exposed on the outer radial side 58 of phase housing 50. The inner radial side 56 of phase housing 50 can be closed with openings only for the wire ends 88 of coil 42 that supply current to coil 42 to extend therethrough. In the example shown, phase housing 50 includes an array of openings on the outer radial side 58, which openings are formed by tooth slots 60. In the example shown, the teeth 46 do not project through the tooth slots 60 on the outer radial side 58 but wire ends 88 do project through the openings on the inner radial side 56. It is understood that in an inner rotator example the openings are formed on the inner radial side 56 and the wire ends 88 extend radially outwards through the outer radial side 58.

Power block 84 is formed on inner radial side 56 of phase housing 50. Wire ends 88 of the coil 42 extend through power block 84 to exit from within phase housing 50. Power block 84 can provide a locating feature to facilitate alignment between multiple stator phases 18 during assembly of the stator, as discussed in more detail below. Power block 84 can form a largest radial projection from phase housing 50. In the example shown, power block 84 is formed on an inner radial side 56 of phase housing 50, but it is understood that power block 84 can be formed on the outer radial side 58 in inner rotator examples.

In the example shown, the teeth 46 are exposed on the outer radial side 58 of phase housing 50, as stator phase 18 is configured for use in an outer rotator. In inner rotator examples, teeth 46 are oriented radially inward towards the common axis CA. In such an inner rotator example, the phase housing 50 can include tooth slots 60 oriented radially inward towards the axis CA.

The metallic components of stator phase 18 are disposed axially between the first axial side 52 and second axial side 54 of phase housing 50. Phase housing 50 can be overmolded on stator phase 18 to form phase assembly 48. In some examples, phase housing 50 can be formed as a polymer case. In some examples, phase housing 50 can be injection molded in and around the stator phase 18.

Boss 62 is formed on first axial side 52 and is formed as a projection extending from the first axial side 52. Boss 62 is circular in the example shown. More specifically, boss 62 is a cylindrical projection in the example shown. The projection forming boss 62 can include radial walls extending purely axially or sloped inward such that boss 62 is frustoconical. Boss 62 is formed radially between first outer ring 66 and first inner ring 68. First outer ring 66 extends annularly about the boss 62 and is formed between an outer radial edge of boss 62 and the outer radial side 58 of phase housing 50. First inner ring 68 is formed on an inner radial side of boss 62. First inner ring 68 extends annularly about the axis CA and the opening through phase housing 50. First inner ring 68 is formed between the inner radial edge of boss 62 and the inner radial side 56 of phase housing 50. The boss 62 projects axially relative to first outer ring 66 and first inner ring 68. Boss 62, first inner ring 68, and first outer ring 66 are disposed coaxially about common axis CA.

Locator 70 is disposed circumferentially between first and second circumferential ends of the first inner ring 68. Locator 70 is formed as a projection relative to the recessed first inner ring 68, the first inner ring 68 being recessed relative to the boss 62. Locator 70 is a projection on first axial side 52. In the example shown, locator 70 is at least partially formed by power block 84. In the example shown, the axial face of locator 70 on first axial side 52 is aligned at a common axial location along the axis CA with the axial face of boss 62. The axial face of locator 70 can be considered to be planar with the axial face of boss 62.

Recesses 72 are formed on first axial side 52. Recesses 72 extend into boss 62. More specifically, recesses 72 extend into the axial face of boss 62. In the example shown, phase housing 50 includes an array of recesses 72. More specifically, the recesses 72 are formed in an annular array extending about axis CA. In the example shown, recesses 72 are formed as radially elongate openings. It is understood, however, that recesses 72 can be of any desired shape suitable for interfacing with features of an adjacent phase assembly 48 to prevent rotation between the adjacent ones of phase assemblies 48. In the example shown, recesses 72 are configured to interface with first projections 74 extending from second axial side 54, as discussed in more detail below. Phase assembly 48 can be considered to include a first receiver, formed by the recesses 72, and a second receiver, formed by the first inner ring 68. The receivers are configured to form a keyed interface with an adjacent phase assembly 48.

Second axial side 54 is an opposite axial side of phase housing 50 from first axial side 52. In the example shown, pocket 64 is axially aligned with and axially overlaps with boss 62 along the common axis CA to facilitate mating between adjacent phase assemblies 48, as discussed in more detail below with regard to FIGS. 6A and 6B. Pocket 64 is formed on second axial side 54 of phase housing 50. Pocket 64 can be considered to be cylindrical in the example shown. The cylindrical recess forming pocket 64 can include radial walls extending purely axially or sloped inward such that projection 64 is frustoconical. Pocket 64 is recessed relative to second outer ring 76. Second outer ring 76 is formed on an outer radial side of pocket 64. Second outer ring 76 extends annularly about the axis CA. Pocket 64 and second outer ring 76 are disposed coaxially about common axis CA. Second outer ring 76 is axially aligned with first outer ring 66.

Pocket 64 extends radially between second outer ring 76 and second inner ring 78. Second inner ring 78 is formed on an inner radial side of pocket 64. Second inner ring 78 is axially aligned with first inner ring 68. Pocket 64 is recessed relative to both the second outer ring 76 and the second inner ring 78. In some examples, second inner ring 78 and second outer ring 76 can project the same axial distance relative to the axial face of phase housing 50 within pocket 64. In such an example, the axial surfaces of second outer ring 76 and second inner ring 78 can be considered to be planar with each other.

In the example shown, second inner ring 78 is formed as a split ring. More specifically, second inner ring 78 is formed by an array of second projections 80 extending annularly about the axis CA. In the example shown, second projections 80 are arcuate projections. Gaps 82 are disposed circumferentially between the second projections 80. The second projections 80 project axially relative to the axial face of pocket 64.

First projections 74 are formed on second axial side 54. More specifically, first projections 74 extend axially from within pocket 64. In the example shown, phase housing 50 includes an array of first projections 74. More specifically, the first projections 74 are formed as an annular array extending about the axis CA. In the example shown, each first projection 74 is formed as a radially elongate projection. It is understood, however, that first projections 74 can be of any desired shape suitable for interfacing with recesses 72 and preventing rotation between adjacent ones of stator phases 18. First projections 74 and recesses 72 form aligning features that maintain alignment between adjacent phase assemblies 48 during assembly of a stator and can fix adjacent phase assemblies 48 together to prevent relative rotation between the adjacent phase assemblies 48 during operation of the motor.

When adjacent phase assemblies 48 are assembled together, the locator 70 of a first one of the phase assemblies 48 is disposed in one of the gaps 82 of an adjacent, second one of the phase assemblies 48. The locator 70 being disposed in a gap 82 aligns the phase assemblies 48 to facilitate the desired offset for providing the driving electrical signals to the stator phases 18 of those phase assemblies 48. The second projections 80 are disposed in the recess formed by the first inner ring 68 and the locator 70 extends into a gap 82 between adjacent ones of the second projections 80.

As shown, for a phase assembly 48, the locator 70 on the first axial side 52 is circumferentially offset from the gaps 82 on the second axial side 54 about the common axis CA. As such, mating ones of the phase assemblies 48 will be offset about the common axis CA with a locator 70 disposed in a gap 82 regardless of which gap 82 the locator 70 is disposed within. It is understood, however, that in other examples, the locator 70 can be axially aligned, and not offset from, a gap 82. In such an example, the various stator phases 18 can be axially aligned and not rotationally offset with the locator 70 disposed in a gap 82. Such a configuration is configured to form a stator for use with a rotor formed from multiple rotor phases wherein the magnet arrays of the various rotor phases are rotationally offset about the common axis CA, as discussed in more detail below with regard to FIGS. 7A-7C.

Phase assembly 48 provides significant advantages. Phase housing 50 provides mechanical robustness to stator phase 18 to maintain alignment between components of stator phase 18. Phase housing 50 further provides electrical insulation to the components of stator phase 18 while also facilitating heat transfer away from components of stator phase 18. Phase housing 50 includes integral aligning features to secure adjacent phase assemblies 48 together to facilitate assembly of the stator of a motor. The aligning features can rotationally lock the multiple stator phases 18 of the phase assemblies 48 relative to each other to provide the desired alignment. The mating interfaces maintain alignment during assembly of a stator when the phase assemblies 48 are fixed together, such as by embedding in potting compound. The aligning features can align the stator phases 18 to ensure desired offset for operation (e.g., by offsetting the phase assemblies by 120-degrees electrically, which may be less than 120-degrees about the common axis CA). The aligning features facilitate stacking of multiple stator phases 18 to form an electric motor having any desired number of stator phases 18.

Figure 6A:
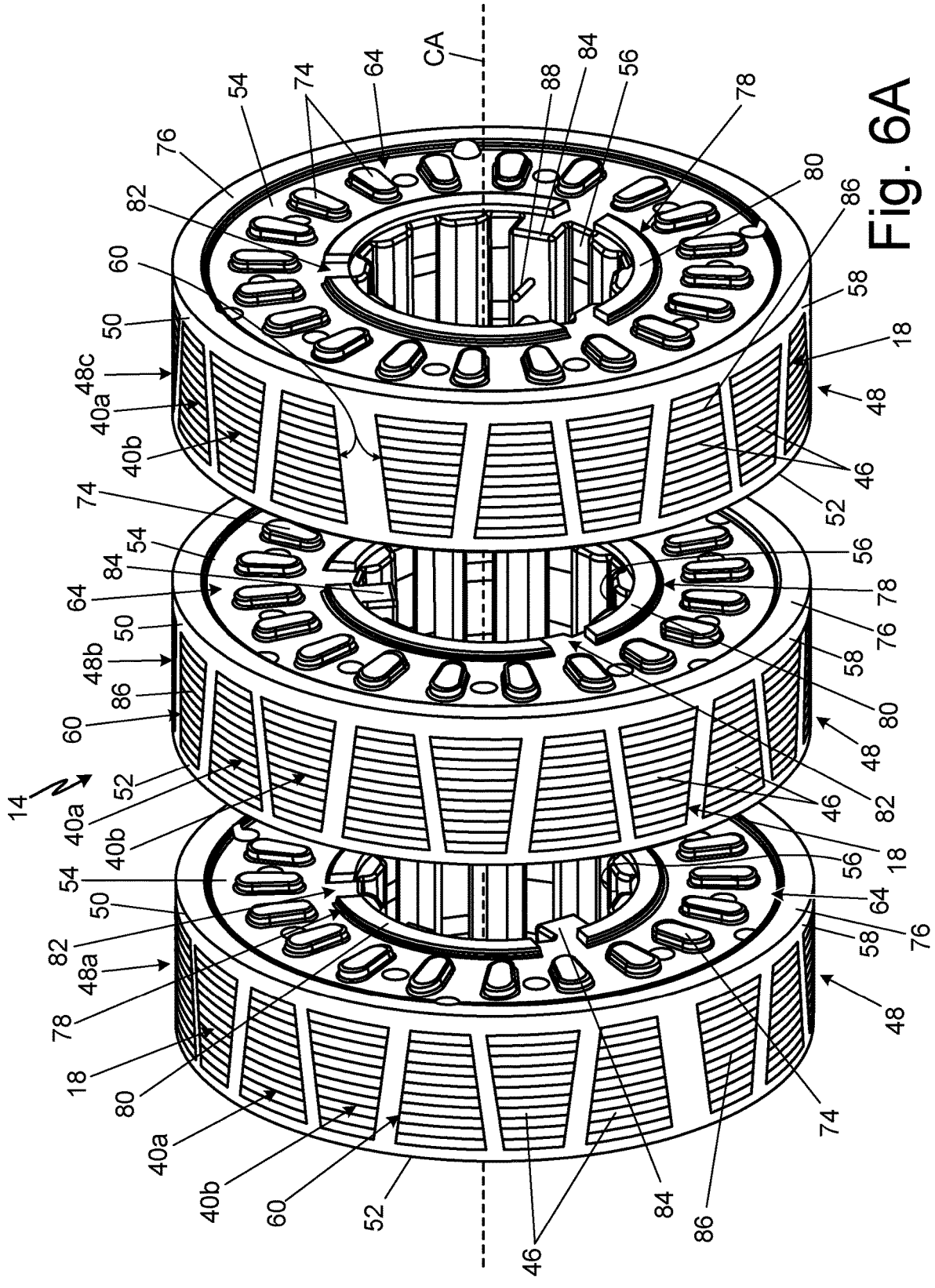
FIG. 6A is an isometric exploded view of stator.
Figure 6B:
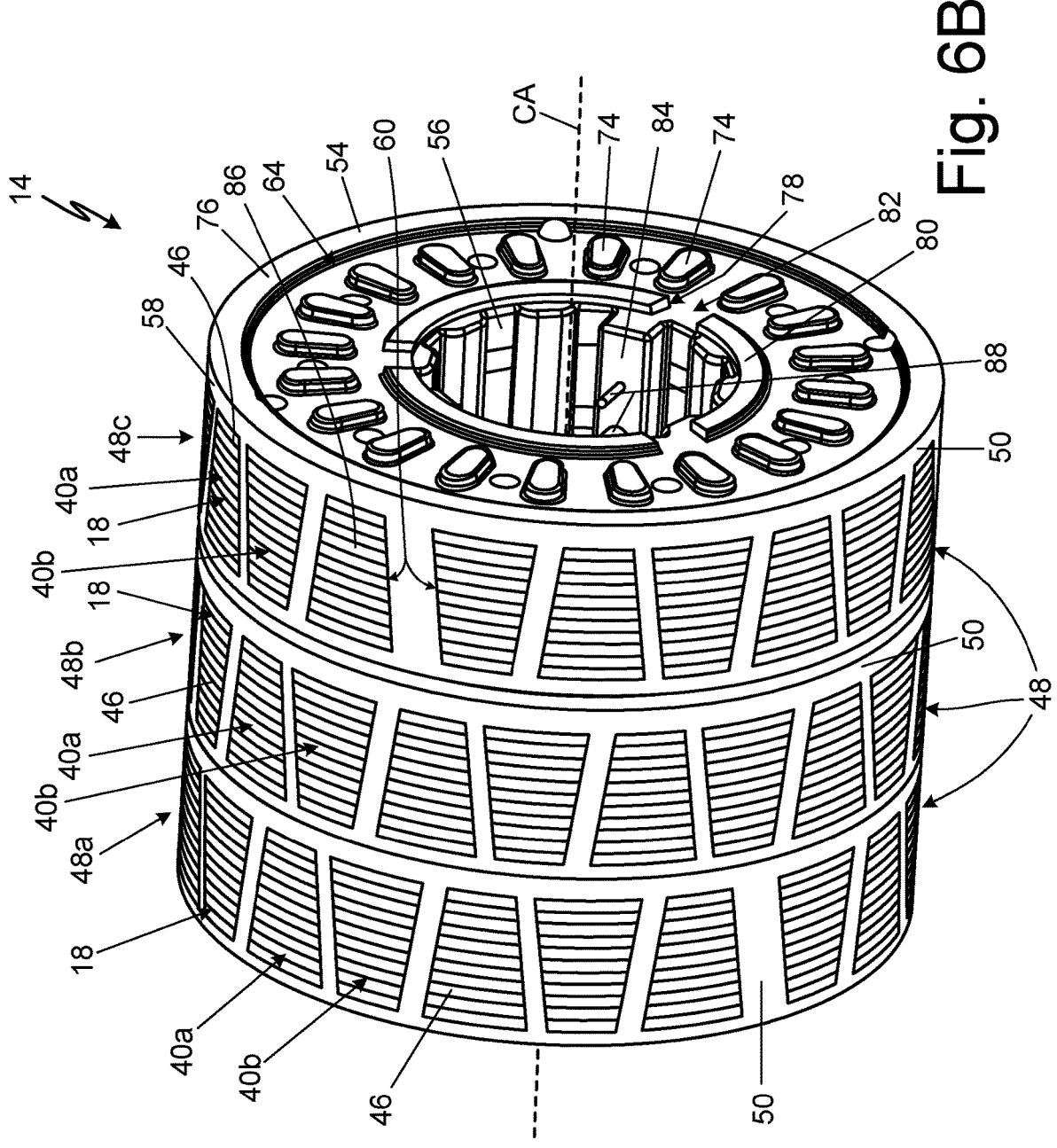
FIG. 6B is an isometric view of the stator of FIG. 6A.

FIG. 6A is an exploded isometric view of stator 14 showing phase assemblies 48a-48c (collectively herein "phase assembly 48" or "phase assemblies 48"). FIG. 6B is an isometric view of a stator 14 showing phase assemblies 48a-48c assembled together. FIGS. 6A and 6B will be discussed together and with continued reference to FIGS. 5A and 5B. Each phase assembly 48a-48c can be identically formed. Phase assemblies 48a-48c are assembled together and stacked along the common axis CA to form the stator 14 of an electric motor. Phase assemblies 48 are stacked along the common axis CA and assembled together to increase, by adding additional stator phases 18, or decrease, by removing stator phases 18, the torque output of the electric motor.

Phase assemblies 48 are stacked such that the first axial side 52 of one stator phase 18 interfaces with and engages the second axial side 54 of an adjacent stator phase 18. In the example shown, first axial side 52 of phase assembly 48b interfaces with second axial side 54 of phase assembly 48a, and second axial side 54 of phase assembly 48b interfaces with first axial side 52 of phase assembly 48c. Phase assemblies 48 interface at keyed interfaces. The keyed interface between adjacent phase assemblies 48 can both rotationally fix the stator phases 18 together to prevent relative rotation and align stator phases 18 for operation based on the electrically offset driving signals.

In the example shown, the keyed interface is formed by the interface between first axial side 52 of a first one of phase assemblies 48 and a second axial side 54 of a second one of phase assemblies 48. Boss 62 extends from first axial side 52 of the first one of the phase assemblies 48 and is disposed within pocket 64 formed on second axial side 54 of the second one of the phase assemblies 48. First projections 74 extend into recesses 72. First projections 74 interfacing with recesses 72 forms an annular interface that fixes the adjacent phase assemblies 48 together. The interface between first projections 74 and recesses 72 extends about the axis CA and provides a balanced interface about the axis CA to prevent unbalanced loading on either of the interfacing phase assemblies 48.

The keyed interface is further formed between the first inner ring 68 and the second inner ring 78. More specifically, the second projections 80 extend into the recess forming the second inner ring 78 and locator 70 extends into one of the gaps 82 of the second inner ring 78. Gaps 82 are configured such that locator 70 extends into one of gaps 82 with the adjacent phase assemblies 48 interfacing. The locator 70 extending into the gap 82 aligns the adjacent phase assemblies 48 for operation. The phase assemblies 48 are aligned for operation to provide the desired electrical offset. In the example shown, the phase assemblies 48 are offset about the common axis CA to facilitate a 120-degree electrical offset. More specifically, phase assemblies 48 are offset such that the teeth 46 of flux ring 40a of phase assembly 48a are axially misaligned with the teeth 46 of flux ring 40a of phase assembly 48b and are axially misaligned with the teeth 46 of flux ring 40a of phase assembly 48c. It is understood that locator 70 and gaps 82 can be configured to align axially phase assemblies 48, such that teeth 46 or flux rings 40a of phase assemblies 48a-48c are axially aligned.

In the example shown, each phase assembly 48 includes three gaps 82 between the three second projections 80. The gaps 82 can be 120-degrees offset relative to each other such that each phase assembly 48 is 120-degrees rotationally offset relative to adjacent ones of the phase assemblies 48. It is understood that the gaps 82 can be configured such that adjacent stator phases 18 are less than 120-degrees rotationally offset while still being 120-degrees electrically offset. The interface between locator 70 and gap 82 clocks the phase assemblies 48a-48c about the common axis CA to facilitate operation of the electric motor. While phase assemblies 48 are shown as including three gaps 82 to facilitate a three phase stator 14, it is understood that phase assemblies 48 can be formed with any desired number of gaps 82, such as one, two, four, or more, to facilitate assembly of stators 14 having more or fewer than three phases. While stator 14 is shown as including three stator phases 18a-18c, it is understood that any desired number of stator phases 18 can be assembled together to form the stator 14. In the example including a mechanical offset between gaps 82 associated with a 120-degree electrical offset the stator 14 can include three, six, nine, or other number of phase assemblies 48 in a multiple of three.

As shown in FIG. 6A, the power block 84, from which locator 70 is formed in the example shown, of phase assembly 48a is rotationally offset from the power block 84 of phase assembly 48b and is rotationally offset from the power block 84 of phase assembly 48c. The power block 84 of phase assembly 48b is rotationally offset from the power block 84 of phase assembly 48c. As shown in FIG. 6B, the teeth 46 of each stator phase 18 are rotationally offset from the teeth 46 of the other stator phases 18. The offset facilitates controlling operation of the motor by the AC signals provided to the various phase assemblies 48 forming stator 14. It is understood that other examples can have teeth 46 aligned, and in such examples a rotor can have the magnet phases rotationally offset about the axis CA.

Stator 14 and phase assemblies 48 provide significant advantages. Phase housings 50 can be formed with indexing features (e.g., the first projections 74 and recesses 72, the gaps 82 and locators 70) in any desired orientation to fix adjacent phase assemblies 48 together and align the phase assemblies 48 for operation. The keyed interface between adjacent phase assemblies 48 rotationally fixes the adjacent phase assemblies 48 together, easing the manufacturing process by preventing rotation during assembly, such as during the potting process, and providing a mechanically robust stator 14. The keyed interface can further locate the stator phases 18 relative to each other to ensure proper alignment for providing the driving electrical signals to the stator phases 18, simplifying the manufacturing process and making for a more efficient and quicker manufacturing process.

Figure 7A:
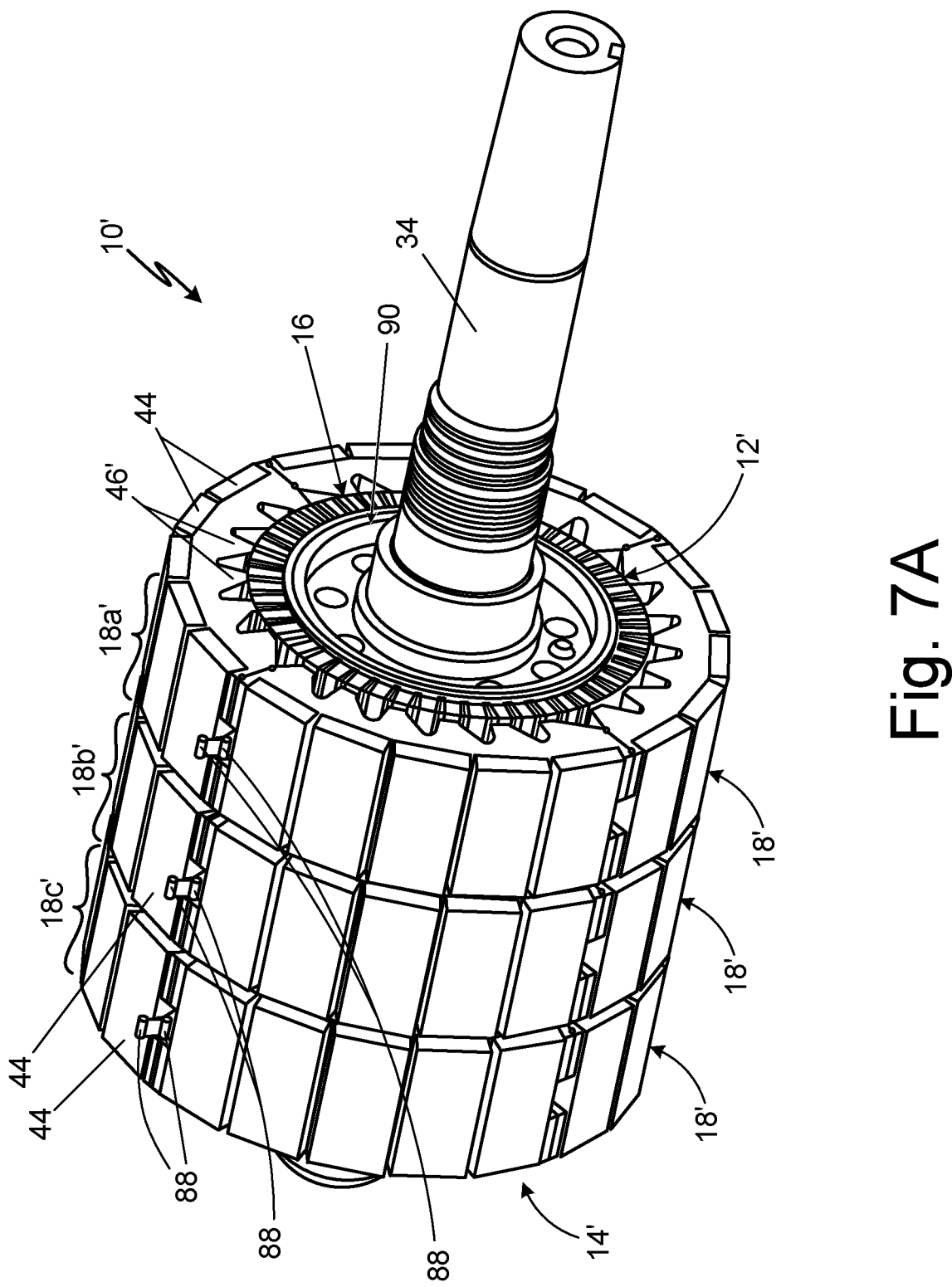
FIG. 7A is an isometric view of a rotor and a stator of an electric motor. 7A.
Figure 7B:
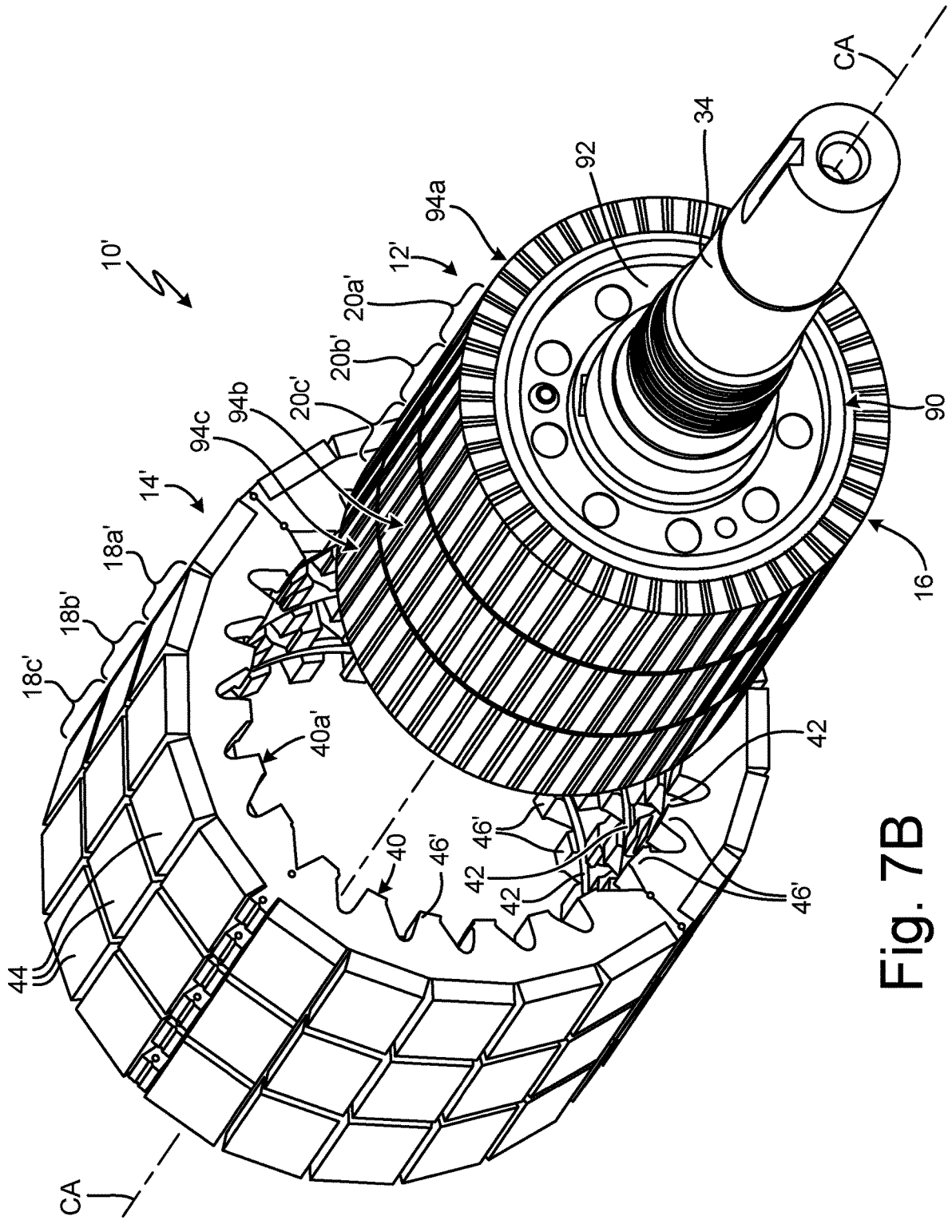
FIG. 7B is a partially exploded isometric view of the rotor and stator shown in FIG.
Figure 7C:
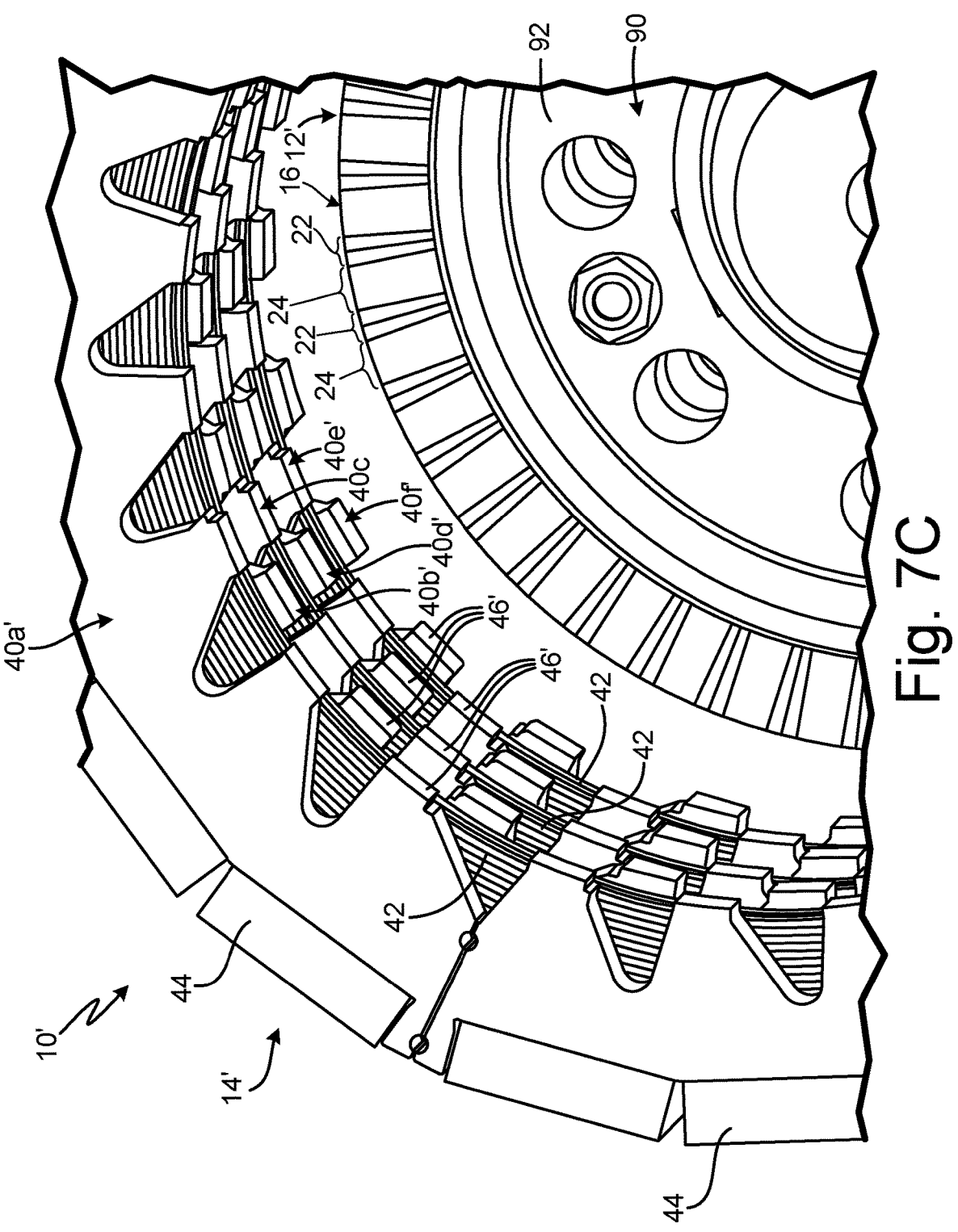
FIG. 7C is an enlarged, exploded, isometric view of a portion of the rotor and stator shown in FIG. 7A.

FIG. 7A is an isometric view of rotor 12' and stator 14' of motor 10'. FIG. 7B is a partially exploded isometric view of the rotor 12' and stator 14' shown in FIG. 7A. FIG. 7C is an enlarged, exploded, isometric view of a portion of rotor 12' and stator 14'. FIGS. 7A-7C will be discussed together. Drive shaft 34, rotor 12', and stator 14', of an inner rotator electric motor 10' are shown. Stator 14' is formed by stator phases 18a'-18c' (collectively herein "stator phase 18'" or "stator phases 18'"). Stator phase 18a' includes flux rings 40a', 40b', coil 42, and axial returns 44. Stator phase 18b' includes flux rings 40c', 40d', coil 42, and axial returns 44. Stator phase 18c' includes flux rings 40e', 40f', coil 42, and axial returns 44. Rotor 12' includes rotor body 90 and permanent magnet array 16. Rotor 12' is formed in rotor phases 20a'-20c'. Rotor phase 20a' includes rotor hub 92 and magnet phase 94a. Rotor phase 20b' includes rotor hub 92 and magnet phase 94b. Rotor phase 20c' includes rotor hub 92 and magnet phase 94c.

Stator 14' and rotor 12' are disposed coaxially to generate a rotational mechanical output based on electrical inputs. In the example shown, rotor 12' is disposed within stator 14' such that motor 10' is an inner rotator, though it is understood that other examples of motor 10' are configured as outer rotators having a rotor disposed about the stator. Stator 14' defines a cylindrical interior that rotor 12' is disposed within. Stator 14' is formed by stator phases 18' arrayed along common axis CA. Each stator phase 18' is formed as an annular ring disposed about common axis CA.

Each stator phase 18' includes first and second flux rings 40' (e.g., flux rings 40a', 40b' of stator phase 18a') disposed on opposite axial sides of a coil 42 of that stator phase 18'. Teeth 46' are formed on a radial side of each flux ring 40' facing rotor 12'. Teeth 46' are disposed across air gap 36 from rotor 12'. In the example shown, teeth 46' project radially and do not project axially. As such, teeth 46', unlike teeth 46 (FIGS. 4-6B), do not radially overlap with coil 42. It is understood, however, that some examples of stator 14' can include teeth 46' projecting axially to be disposed directly between coil 42 and rotor 12', similar to teeth 46'.

In each stator phase 18', an annular array of axial returns 44 extends between the opposing flux rings 40'. The axial returns 44 are disposed on an opposite radial side of the coil 42 from rotor 12' and teeth 46'. As shown, the axial returns 44 form the outermost electromagnetic portion of stator 14'. In the example shown, axial returns 44 form the radially outermost laminate structure of the electric motor 10'. For each stator phase 18', coils 42 are disposed axially between the first and second flux rings 40' of the stator phase 18'. The wire ends 88 of the multiple coils 42 of the stator phases 18a'-18c' are shown as arrayed along the common axis CA and aligned axially along the common axis CA.

Rotor 12' is configured similar to stator 14', in the example shown, in that rotor 12' is formed from multiple rotor phases 20' configured to operate together. Rotor 12' includes multiple rotor phases 20' disposed along common axis CA. Rotor body 90 supports permanent magnet array 16. As best seen in FIG. 7B, the rotor 12' in the example shown includes three rotor phases 20a'-20c'. Each rotor phase 20' corresponds with a single stator phase 18' of stator 14'. It is understood that motor 10' can include more or fewer than three rotor phases 20'. In some examples, a single rotor phase 20' corresponds with multiple stator phases 18'. For example, a stator including six stator phases 18' could include a single rotor phase 20' associated with all six stator phases 18', six rotor phases 20' that are each associated with a single stator phase 18', two rotor phases 20' each associated with a set of three stator phases 18', among other options. In the example shown, the rotor phases 20a'-20c' radially overlap only with a single one of the stator phases 18a'-18c', respectively, along the common axis CA. For example, the rotor phase 20a' does not radially overlap with the stator phase 18b' or stator phase 18c' but instead only radially overlaps with and corresponds with stator phase 18a'.

Permanent magnet array 16 is formed by alternating permanent magnets 22 and concentrators 24. In the example shown, permanent magnet array 16 is formed by magnet phases 94a-94c respectively associated with rotor phases 20a'-20c'. The rotor body 90 is formed by the multiple rotor hubs 92 of the rotor phases 20'. The rotor hubs 92 are connected to the drive shaft 34. In the example shown, each magnet phase 94 is disposed on the outer radial side of an associated rotor hub 92. The example shown includes three rotor hubs 92 for the three rotor phases 20a'-20c'.

Each of the rotor phases 20' may contain only one annular array of interspersed permanent magnets 22 and concentrators 24. The three phase motor shown contains three annular arrays of interspersed permanent magnets 22 and concentrators 24, the three annular arrays themselves disposed along the common axis CA and not radially overlapping each other. Each annular array of interspersed permanent magnets 22 and concentrators 24 only radially overlaps with one stator phase 18'. While rotor 12' is shown as including multiple rotor phases 20' each having a rotor hub 92, it is understood that some examples of rotor 12' can include rotor phases 20' sharing a common hub and with circumferentially offset magnet phases 94 each fixed to the common hub.

The magnet phases 94a-94c are circumferentially offset from each other about common axis CA. As shown, magnet phase 94a is misaligned with magnet phase 94b and magnet phase 94c, and magnet phase 94b is misaligned with magnet phase 94c. As shown, the permanent magnets 22 of the multiple rotor phases 20' are axially misaligned, or circumferentially offset, about the common axis CA with respect to each other. Likewise, the concentrators 24 of the respective magnet phases 94 are axially misaligned, or circumferentially offset, about the common axis CA with respect to each other. The offset facilitates the phase offsets of the driving signals of the respective stator phases 18a'-18c' (e.g., the signals delivered 120-degrees electrically offset) to operate motor 10' at high efficiency and with improved torque output and speed control.

Each stator phase 18' includes two annular arrays of teeth 46' disposed on opposite axial sides of the coil 42 of that stator phase 18'. Each stator phase 18' includes a first flux ring 40' (e.g., flux ring 40a' of stator phase 18a'; flux ring 40c' of stator phase 18b'; and flux ring 40e' of stator phase 18c') and a second flux ring 40' (e.g., flux ring 40b' of stator phase 18a'; flux ring 40d' of stator phase 18b'; and flux ring 40f' of stator phase 18c'). The first flux ring 40' has a first annular array of teeth 46' and the second flux ring 40' has a second annular array of teeth 46'. While rotor phases 20a'-20c' are offset about the axis CA and thus axially misaligned, stator phases 18a'-18c' not offset and are instead axially aligned. Stator phases 18a'-18c' are axially aligned with each other along common axis CA. Stator phases 18a'-18c', in particular the teeth 46' of the respective first ones of flux rings 40' of each stator phase 18' and the teeth 46' of the respective second ones of flux rings 40' of each stator phase 18', are aligned.

Within each stator phase 18', the first annular array of teeth 46' is disposed on a first axial side of coil 42 while the second annular array of teeth 46' is disposed on the second, opposite axial side of the coil 42. Within each stator phase 18', the teeth 46' of the first annular array of teeth 46' are misaligned or offset relative to the teeth 46' of the second annular array of teeth 46' to facilitate flux coupling across the magnet phase 94 from oppositely poled teeth 46' of the two annular arrays of teeth 46' of a stator phase 18'. For example, the teeth 46' of flux ring 40a' are misaligned with the teeth 46' of flux ring 40b'. While the teeth 46' within each stator phase 18' are offset and misaligned (circumferentially and axially), the respective teeth 46' of the first flux rings 40' of the multiple stator phases 18' are axially aligned and the respective teeth 46' of the second flux rings 40' of the multiple stator phases 18' are axially aligned. In the example shown, teeth 46' of flux ring 40a', teeth 46' of flux ring 40c', and teeth 46' of flux ring 40e' are axially aligned. In the example shown, teeth 46' of flux ring 40b', teeth 46' of flux ring 40d', and teeth 46' of flux ring 40f' are axially aligned. The teeth 46' of the flux rings 40a', 40c', 40e' are aligned with each other but offset with respect to the teeth 46' of the flux rings 40b', 40d', 40f'. Likewise, the teeth 46' of the flux rings 40b', 40d', 40f' are aligned with each other but offset with respect to the teeth 46' of the flux rings 40a', 40c', 40e'.

The AC signals routed through the coils 42 are synchronized to develop magnetic fields through the flux rings 40' in time with the rotational position of permanent magnet array 16 to drive rotation of rotor 12'. The respective AC signals (e.g., sinusoidal or trapezoidal) delivered through the coils 42 in each stator phase 18a'-18c' are out of phase with respect to each other. In this way, the permanent magnets 22 forming the permanent magnet array 16 more frequently have flux peaks acting on them, as compared to synchronizing the AC signals, thereby providing a smoother torque profile acting on the rotor 12' along the axis of rotation of rotor 12'. The offset permanent magnets 22 of the multiple magnet phases 94 are positioned relative to each other to interact with the flux generated by the aligned stator phases 18a'-18c' in time with the signals. The embodiment of the electric motor 10' discussed has three phases corresponding to the three stator phases 18a', 18b', 18c' and respective coils 42 therein. As such, three AC signals are delivered through the coils 42 120-degrees electrically offset. If there were two stator phases 18' and two coils 42, then the two sinusoidal AC signals would be 180-degrees electrically offset, or 90-degrees electrically offset for sets of four stator phases 18' and four coils 42. The magnet phases 94 are offset relative to each other about common axis CA to position magnet phases 94 at desired circumferential positions relative to the associated teeth 46' based on the offset between the driving signals.

Stator phases 18a'-18c' can each be of the same configuration such that a common base stator phase 18' can be used to form any one of the multiple stator phases 18' of the motor 10'. Stator phases 18a'-18c' being aligned about common axis CA facilitates ease of assembly of motor 10' and prevents misalignment between the multiple stator phases 18'. The aligned teeth 46' across the various stator phases 18a'-18c' facilitate the stator phases 18a'-18c' electromagnetically interacting with the misaligned magnet phases 94 to provide continuous smooth torquing by the electrically offset signals to efficiently drive rotor 12' with a smooth torque profile.

Figure 8:
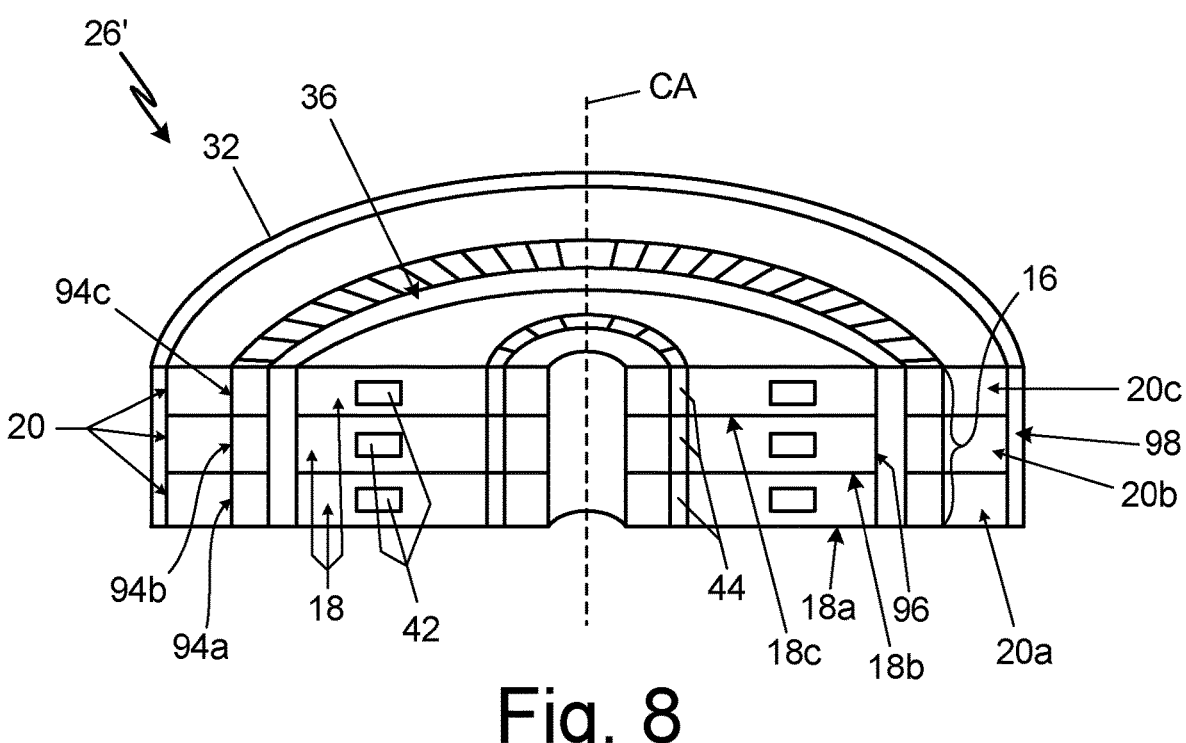
FIG. 8 is a schematic cross-sectional block diagram of a motor segment

FIG. 8 is a schematic cross-sectional block diagram of a motor segment 26'. Motor segment 26' includes stator segment 96, rotor segment 98, and segment housing 32. Stator segment 96 includes stator phases 18a-18c. Rotor segments 98a-98c include rotor phases 20a-20c. Motor segment 26' is configured for use in an outer rotator motor, such as motor 10 (FIG. 1). The segment housing 32 can be a self-contained housing that wholly contains the stator phases 18 and rotor phases 20 of the motor segment 26'. In some examples, the segment housing 32 can circumferentially enclose the stator segment 96 and rotor segment 98. In the outer rotator example shown, the segment housing 32 can extend around each axial side of the motor segment 26' to facilitate mounting of the rotor segment 98 on a support shaft. In some examples, end plates or caps can be mounted to the axial ends of the segment housing 32 to enclose the axial ends and such end plates or caps can be configured to mount to the support shaft to allow for rotation of the rotor segment 98 relative to the support shaft. For example, the end plates can include or mount to bearings, such as ball bearings or tapered roller bearings among other options, to mount motor segment 26' to the shaft.

In the example shown, the motor segment 26' includes multiple stator phases 18a-18c forming the stator segment 96 and includes multiple rotor phases 20a-20c forming the rotor segment 98. As discussed above with respect to FIG. 3, it is understood that each motor segment 26' can include one or multiple stator segments 96 and one or multiple rotor segments 98. It is understood that each stator segment 96 can include one or multiple stator phases 18. It is understood that each rotor segment 98 can include one or multiple rotor phases 20.

Each stator phase 18 includes a coil 42 and an array of axial returns 44 extending about the common axis CA. Each stator phase 18 includes opposing flux rings on opposite axial sides of the coil 42. Each rotor phase 20 includes a rotor body 90 and permanent magnet array 16 supported by the rotor body 90. In the example shown, the rotor phases 20a-20c share a common rotor body 90 with each rotor phase 20 having a separate permanent magnet array 16. It is understood, however, that each rotor phase 20a-20c can include a separate rotor hub that together form the rotor body 90. Air gap 36 is disposed radially between stator segment 96 and rotor segment 98.

In some examples, stator segment 96 is configured such that the teeth of the various flux rings are aligned between stator phases 18a-18c, similar to the configuration shown in FIG. 7C. In such an example, the magnet phases 94a-94c of the rotor phases 20a-20c can be axially misaligned and rotationally offset about the common axis CA. In some examples, stator segment 96 is configured such that teeth 46 of the various flux rings 40 are misaligned between the stator phases 18a-18c, as is best seen in FIG. 6B. In such an example, the magnet phases 94a-94c of the rotor phases 20a-20c can be axially aligned or formed by unitary magnets, and in some examples concentrators, extending along the axial length of the rotor segment 98.

Motor segment 26' provides significant advantages. Motor segment 26' includes one or multiple stator phases 18 and rotor phases 20 in a unitary assembly. The motor segment 26' fully contains the electromagnetic components of that portion of a motor. Assembling stator phases 18 and rotor phases 20 into a common motor segment 26' facilitates easy assembly of a motor and prevents misalignment between the stator segments 96 and rotor segments 98.

Figure 9:
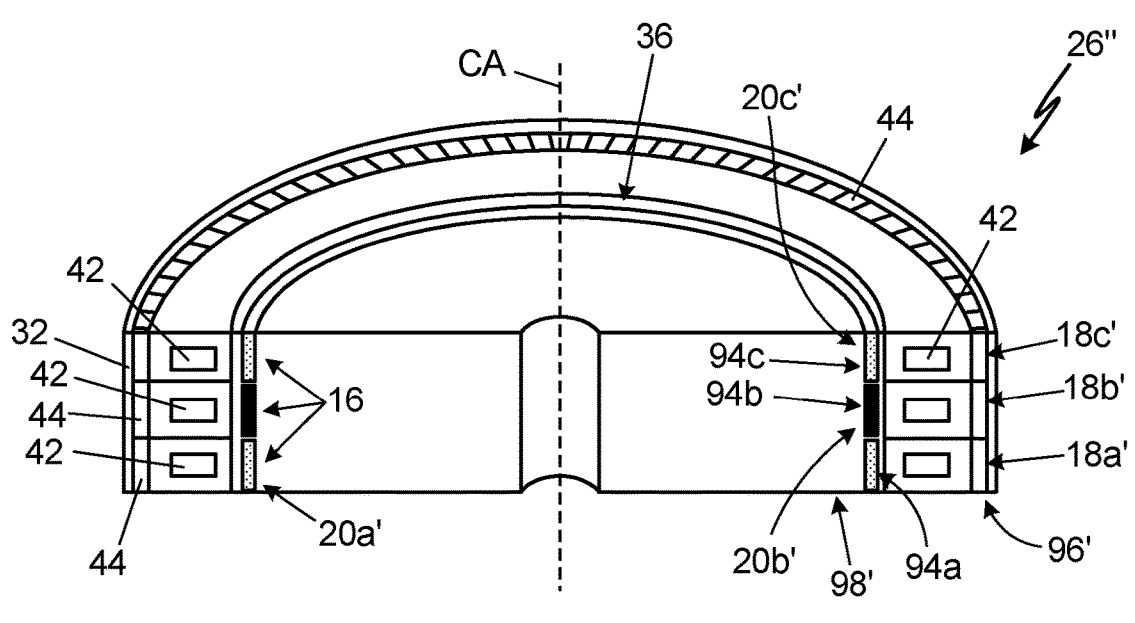
FIG. 9 is a schematic cross-sectional block diagram of a motor segment.

FIG. 9 is a schematic cross-sectional block diagram of a motor segment 26". Motor segment 26" includes stator segment 96', rotor segment 98', and segment housing 32. Stator segment 96' includes stator phases 18a'-18c'. Rotor segments 98a'-98c' include rotor phases 20a'-20c'. Motor segment 26" is configured for use in an inner rotator motor, such as motor 10' (FIG. 2). The segment housing 32 can be a self-contained housing that wholly contains the stator phases 18' and rotor phases 20' of the motor segment 26". In some examples, the segment housing 32 can circumferentially enclose the stator segment 96' and rotor segment 98' and can, in some examples, extend around each axial side of the motor segment 26".

In the example shown, the motor segment 26" includes multiple stator phases 18a'-18c' forming the stator segment 96' and includes multiple rotor phases 20a'-20c' forming the rotor segment 98'. As discussed above with respect to FIG. 3, it is understood that each motor segment 26" can include one or multiple stator phases 18' and one or multiple rotor phases 20'. It is understood that each stator segment 96' can include one or multiple stator phases 18'. It is understood that each rotor segment 98' can include one or multiple rotor phases 20'.

Each stator phase 18' includes a coil 42 and an array of axial returns 44 extending about the common axis CA. Each stator phase 18' includes opposing flux rings on opposite axial sides of the coil 42. Each rotor phase 20' includes rotor body and permanent magnet array 16. In the example shown, the rotor phases 20a'-20c' share a common rotor body with each rotor phase 20' having a separate permanent magnet array 16. It is understood, however, that each rotor phase 20a'-20c' can include a separate rotor hub that together form the rotor body 90. Air gap 36 is disposed radially between stator segment 96' and rotor segment 98'.

In some examples, stator segment 96' is configured such that the teeth of the various flux rings are aligned between stator phases 18a'-18c', as is best seen in FIG. 7C. In such an example, the magnet phases 94a-94c of the rotor phases 20a'-20c' can be axially misaligned and rotationally offset about the common axis CA. In some examples, stator segment 96' is configured such that teeth 46' of the various flux rings 40' are misaligned between the stator phases 18a'-18c', as is best seen in FIG. 6B. In such an example, the magnet phases 94a-94c of the rotor phases 20a'-20c' can be axially aligned or formed by unitary magnets, and in some examples concentrators, extending along the axial length of the rotor segment 98'.

Motor segment 26" provides significant advantages. Motor segment 26" includes one or multiple stator phases 18' and rotor phases 20' in a unitary assembly. The motor segment 26" fully contains the electromagnetic components of that portion of a motor. Assembling stator phases 18' and rotor phases 20' into a common motor segment 26" facilitates easy assembly of the motor and prevents misalignment between the stator segments 96' and rotor segments 98'.

Figure 10:
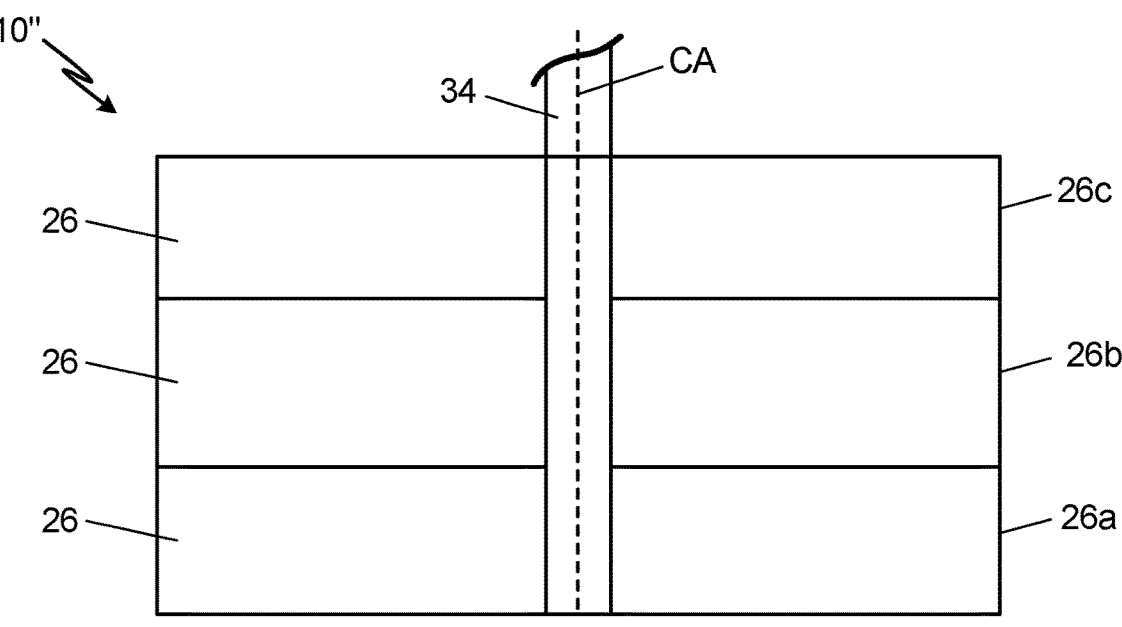
FIG. 10 is a block diagram showing motor segments assembled together to form an electric motor.

FIG. 10 is a schematic block diagram showing motor segments 26a-26c (collectively herein "motor segment 26" or "motor segments 26") assembled together to form an electric motor 10". Motor segments 26a-26c are stacked along shaft 34. In inner rotator examples, the rotor segments 98' (FIG. 9) can be individually fixed with respect to the shaft 34 while the stator segments 96' (FIG. 9) can be fixed to the segment housing 32, which segment housings 32 can be braced to a support structure. In outer rotator examples, the axial-most rotor segments 98 (FIG. 8) can be mounted to bearings that can then be mounted to shaft 34 while the stator segments 96 (FIG. 8) can be mounted to the shaft 34. An output component, such as a second shaft or other projection configured to generate the rotational output, can be fixed to one of the axial-most rotor segments 98. In some examples, the segment housing 32 can include an integral output shaft in the outer rotator examples.

The motor segments 26a-26c can be fixed together. For example, the segment housings 32 of the various motor segments 26 can be interfaced together, such as to prevent relative rotation therebetween. In some examples, the segment housings 32 can be attached to one another, such as by the axial faces of the segment housings 32 interfacing. For example, the segment housings 32 can include keying features, similar to the keying features of the phase assembly 48 shown in FIGS. 5A-6B. In some examples, a single segment housing 32 can be formed to contain all of the motor segments 26a-26c, such that multiple motor segments 26 can be contained together. Additional motor segments 26 can be added to motor 10" to increase the torque output from motor 10". Motor segments 26 can be removed from motor 10" to decrease the torque output from motor 10".

Figure 11:
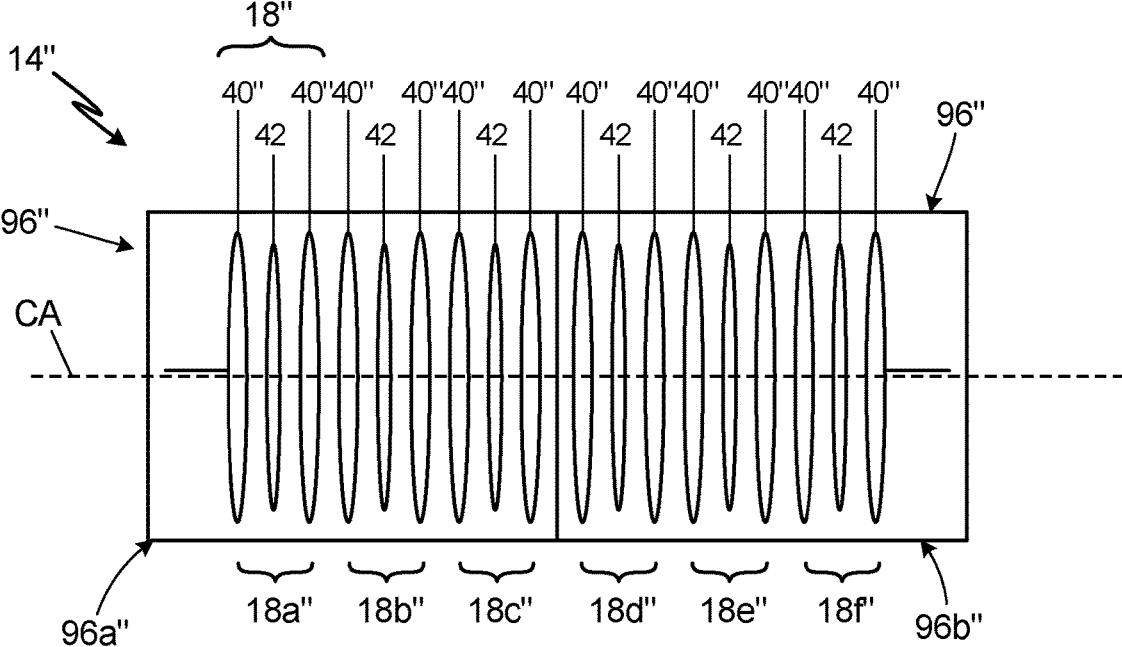
FIG. 11 is a schematic diagram of an electric motor.

FIG. 11 is a schematic block diagram of stator 14". Stator 14" includes stator phases 18a"-18f" (collectively herein "stator phase 18"" or "stator phases 18") that form stator segments 96a", 96b" (collectively herein "stator segment 96" or "stator segments 96"). Flux rings 40" and coil 42 of each stator phase 18" are shown. Flux rings 40" can be substantially similar to flux rings 40 (best seen in FIG. 4) in outer rotator examples or substantially similar to flux rings 40' (best seen in FIGS. 7A-7C) in inner rotator examples. Stator 14" is substantially similar to stator 14 (FIG. 1) and stator 14" (FIG. 2) and can be configured for use in an outer rotator, similar to stator 14, or for use in an inner rotator, similar to stator 14".

Multiple of stator phases 18" are assembled together to form stator segments 96". In the example shown, three stator phases 18a"-18c" are assembled together to form a first single stator segment 96a" and the other three stator phases 18d"-18f" are assembled together to form a second single stator segment 96b". As such, stator 14" is formed by multiple stator segments 96a", 96b", each of which includes multiple stator phases 18". It is understood that, in some examples, fewer or more than two stator segments 96" can be assembled together to form a stator 14". For example, a stator can be formed from one, two, three or more of the stator segments 96" shown.

For each stator segment 96a", 96b", the various stator phases 18" can be electrically connected to the controller and grouped to operate as three phases. The three phases correspond to the time in which a waveform (e.g., sinusoidal or trapezoidal) peaks in a 360-degree framework. The stator phases 18" can be paired in any desired manner to form the three phases of the stator segment 96". For example, "A" can represent a first phase, "B" can represent a second phase, and "C" can represent a third phase, the phases receiving peaks in the electrical signal at different times. The six stator phases 18*a*"-18*f*" forming stator 14" can be grouped in any desired manner to facilitate operation of an electric motor. For example, the stator phases 18*a*"-18*f*" can be arranged axially as ABCABC, AABBCC, ABCCBA, etc. As such, non-adjacent ones of the phases can operate in the same phase, electromagnetically interacting with a rotor in an identical manner in synchronous time with each other. Similarly, adjacent ones of the stator phases 18" can operate in the same phase, electromagnetically interacting with the rotor in an identical manner in synchronous time with each other (e.g., in the example including AABBCC). In some examples, the six stator phases 18*a*"-18*f*" can be operated as six distinct phases that are powered 60-degrees out of phase rather than the 120-degrees out of phase for three phase stator 14".

While stator segments 96" are described as including three distinct stator phases 18" each, it is understood that each stator segment 96" can included as many or as few stator phases 18" as desired. For example, each stator phase 18" can be formed as a separate stator segment 96" in its own segment housing, similar to phase assembly 48 (FIGS. 5A-6B).

Grouping the stator phases 18" into stator segments 96" to form stator 14" provides significant advantages. Stator segments 96" and stator phases 18" can be assembled together in any desired manner to receive the power signals from the controller. The stator phases 18" can be configured to facilitate balanced operation of an electric motor, preventing imbalance during operation and increasing the operational life of the electric motor. Stator segments 96" can be added to the stator 14" or removed from the stator 14" to provide different configurations of electric motors having different torque outputs. Stator segments 96" facilitate quick and easy assembly of different motors from the same base stator segment, decreasing part counts and cost and increasing the efficiency of motor assembly and operation.

While the electric machines of this disclosure are discussed in various contexts, it is understood that electric machines and controls can be utilized in a variety of contexts and systems and are not limited to those discussed. Any one or more of the electric machines discussed can be utilized alone or in unison with one or more additional electric machines to provide mechanical output from an electric signal input for any desired purpose. Further, while electric machines of this disclosure are generally discussed as being an electric motor, it is understood that electric machines of this disclosure can be of any desired form, such as a generator among other options.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An electric motor comprising:
a rotor configured to rotate on an axis; and
a stator configured to electromagnetically drive the rotor to rotate the rotor on the axis, wherein the stator includes a plurality of stator phases, each stator phase of the plurality of stator phases comprising:
a first flux ring disposed about the axis and opposing a second flux ring disposed about the axis;
a coil disposed axially between the first flux ring and the second flux ring; and
a plurality of axial returns extending between the first flux ring and the second flux ring, the plurality of axial returns disposed on an opposite radial side of the coil from the rotor;
wherein a first stator phase of the plurality of stator phases is disposed within a first housing to form a first phase assembly and a second stator phase of the plurality of stator phases is disposed within a second housing to form a second phase assembly;
wherein the first housing contains the first stator phase, and the first housing extends axially outward of the first flux ring of the first stator phase and the second flux ring of the second stator phase in both a first direction along the axis and a second direction along the axis, the second direction opposite the first direction; and
wherein the first phase assembly mates with the second phase assembly at a keyed interface.

2. The electric motor of claim 1, wherein the first phase assembly is the same as the second phase assembly.

3. The electric motor of claim 1, wherein the first phase assembly is rotated about the axis relative to the second phase assembly.

4. The electric motor of claim 1, wherein the keyed interface is configured such that the first phase assembly is capable of mating with the second phase assembly in a plurality of orientations.

5. The electric motor of claim 1, wherein the first housing is formed by overmolding.

6. The electric motor of claim 5, wherein the first stator phase includes a first plurality of teeth exposed through the overmolding of the first housing.

7. The electric motor of claim 6, wherein the first plurality of teeth comprises:
a plurality of first teeth extending from the first flux ring of the first stator phase and over the coil such that the plurality of first teeth are disposed radially between the coil and the rotor;
a plurality of second teeth extending from the second flux ring of the first stator phase and over the coil such that the plurality of second teeth are disposed radially between the coil and the rotor.

8. The electric motor of claim 1, wherein:
the first housing has a first axial side oriented in a first direction along the axis and a second axial side oriented in a second direction along the axis opposite the first direction;
the second housing has a third axial side oriented in the first direction and a fourth axial side oriented in the second direction; and
the keyed interface is formed between the second axial side and the third axial side.

9. The electric motor of claim 8, wherein the second axial side includes a first projection extending therefrom, the third axial side includes a first recess extending into the third axial side, and the keyed interface is formed between the first projection and the first recess.

10. The electric motor of claim 9, including a plurality of the first projections and a plurality of the first recesses, and wherein the plurality of the first projections are disposed in an annular array about the axis.

11. The electric motor of claim 9, wherein the second axial side includes a second projection, the third axial side includes a second recess, and the second projection extends into the second recess.

12. The electric motor of claim 11, wherein the second projection is formed as an array of arcuate projections extending about the axis.

13. The electric motor of claim 11, wherein the second recess is formed as an arcuate recess extending about the axis between a first circumferential end and a second circumferential end, and wherein the second projection includes at least one arcuate projection extending about the axis.

14. The electric motor of claim 13, wherein a locator is formed between the first circumferential end of the second recess and the second circumferential end of the second recess, and wherein the locator is disposed in a gap at least partially defined by the at least one arcuate projection.

15. The electric motor of claim 8, wherein the second axial side includes a pocket recessed into the second axial side, and the third axial side includes a boss extending from the third axial side, and wherein the boss extends into the pocket.

16. An electric motor comprising:

a rotor configured to rotate on an axis; and a stator configured to electromagnetically drive the rotor to rotate the rotor on the axis, wherein the stator includes a plurality of stator phases, each stator phase of the plurality of stator phases comprising:

a first flux ring disposed about the axis and opposing a second flux ring disposed about the axis;

a coil disposed axially between the first flux ring and the second flux ring; and a plurality of axial returns extending between the first flux ring and the second flux ring, the plurality of axial returns disposed on an opposite radial side of the coil from the rotor;

wherein a first stator phase of the plurality of stator phases is disposed within a first housing to form a first phase assembly and a second stator phase of the plurality of stator phases is disposed within a second housing to form a second phase assembly;

wherein the first phase assembly mates with the second phase assembly at a keyed interface;

wherein the first housing has a first axial side oriented in a first direction along the axis and a second axial side oriented in a second direction along the axis opposite the first direction;

wherein the second housing has a third axial side oriented in the first direction along the axis and a fourth axial side oriented in the second direction along the axis;

wherein the second axial side includes a first outer ring extending about the axis, a first inner ring extending about the axis, and a pocket recessed relative to the first outer ring and the first inner ring;

wherein the third axial side includes a second outer ring extending about the axis, a second inner ring extending about the axis, and a boss projecting axially relative to the second outer ring and the second inner ring; and wherein the boss extends into the pocket.

17. The electric motor of claim 16, wherein the keyed interface is formed between a projection on one of the second axial side and the third axial side extending into a recess on another one of the second axial side and the third axial side.

18. The electric motor of claim 16, wherein the keyed interface is formed between the first inner ring and the second inner ring.

19. A phase assembly for an electric motor, the phase assembly comprising:

a stator phase comprising:

a first flux ring disposed about an axis and opposing a second flux ring disposed about the axis;

a coil disposed axially between the first flux ring and the second flux ring; and a plurality of axial returns extending between the first flux ring and the second flux ring; and a phase housing having a first axial side, a second axial side, an outer radial side extending between the first axial side and the second axial side, and an inner radial side extending between the first axial side and the second axial side;

wherein the stator phase is disposed within the phase housing;

wherein the coil and the plurality of axial returns are disposed radially between the inner radial side and the outer radial side, the first flux ring and the second flux ring are disposed on a same axial side of the first axial side, and the first flux ring and the second flux ring are disposed on a same axial side of the second axial side.

20. A phase assembly for an electric motor, the phase assembly comprising:

a stator phase comprising:

a first flux ring disposed about an axis and opposing a second flux ring disposed about the axis;

a coil disposed axially between the first flux ring and the second flux ring; and a plurality of axial returns extending between the first flux ring and the second flux ring; and a phase housing having a first axial side, a second axial side, an outer radial side extending between the first axial side and the second axial side, and an inner radial side extending between the first axial side and the second axial side;

wherein the stator phase is disposed within the phase housing such that the plurality of axial returns are contained in the phase housing, the coil is contained within the phase housing except for wire ends of the coil that project out of the phase housing, the first flux ring is disposed within the phase housing except for first teeth of the first flux ring that are exposed through the phase housing, and the second flux ring is disposed within the phase housing except for second teeth of the second flux ring that are exposed through the phase housing.

\* \* \* \* \*